(12) United States Patent
Kaye et al.

(10) Patent No.: US 7,807,313 B2
(45) Date of Patent: Oct. 5, 2010

(54) COMPACT FUEL CELL PACKAGE

(75) Inventors: Ian W. Kaye, Livermore, CA (US); Jennifer E. Brantley, Dublin, CA (US); Michael C. DeRenzi, San Ramon, CA (US)

(73) Assignee: UltraCell Corporation, Livermore, CA (US)

( * ) Notice: Subject to any disclaimer, the term of this patent is extended or adjusted under 35 U.S.C. 154(b) by 1214 days.

(21) Appl. No.: 11/120,643

(22) Filed: May 2, 2005

(65) Prior Publication Data

US 2006/0134470 A1   Jun. 22, 2006

Related U.S. Application Data

(60) Provisional application No. 60/638,421, filed on Dec. 21, 2004.

(51) Int. Cl.
*H01M 8/02* (2006.01)
*H01M 8/10* (2006.01)

(52) U.S. Cl. .................................. 429/465; 429/507

(58) Field of Classification Search .................. None
See application file for complete search history.

(56) References Cited

U.S. PATENT DOCUMENTS

| | | |
|---|---|---|
| 4,770,955 A | 9/1988 | Ruhl |
| 5,081,095 A | 1/1992 | Bedford et al. |
| 5,486,430 A * | 1/1996 | Gorbell et al. ................. 429/35 |
| 5,525,436 A | 6/1996 | Savinell et al. |
| 5,534,328 A | 7/1996 | Ashmead et al. |
| 5,601,938 A | 2/1997 | Mayer et al. |
| 5,611,214 A | 3/1997 | Wegeng et al. |
| 5,629,104 A * | 5/1997 | Crawford et al. ............... 429/34 |
| 5,641,585 A | 6/1997 | Lessing et al. |
| 5,716,727 A | 2/1998 | Savinell et al. |
| 5,789,093 A | 8/1998 | Malhi |
| 5,811,062 A | 9/1998 | Wegeng et al. |

(Continued)

FOREIGN PATENT DOCUMENTS

DE   19841993   3/2000

(Continued)

OTHER PUBLICATIONS

Official translation of JP02080301, published Mar. 20, 1990, translated by: The McElroy Translation Company Aug. 2009.*

(Continued)

*Primary Examiner*—Dah-Wei D Yuan
*Assistant Examiner*—Maria J Laios
(74) *Attorney, Agent, or Firm*—Beyer Law Group LLP

(57) ABSTRACT

The invention relates to a compact and portable fuel cell package. The package includes a fuel cell that generates electrical energy. Some packages also include a fuel processor that produces hydrogen from a fuel source. Fuel cell packages described herein provide power densities (power per unit volume or mass) at levels not yet seen. One package employs an interconnect disposed at least partially between a fuel cell and a fuel processor. The interconnect forms a structural and plumbing intermediary between the two. Given the portable size of fuel cell packages described herein, the invention is well suited to power portable electronics devices. One portable fuel cell package includes a tether, which allows electrical and detachable coupling to an electronics device.

19 Claims, 16 Drawing Sheets

U.S. PATENT DOCUMENTS

| | | | |
|---|---|---|---|
| 5,961,930 | A | 10/1999 | Chatterjee et al. |
| 5,961,932 | A | 10/1999 | Ghosh et al. |
| 6,077,620 | A | 6/2000 | Pettit |
| 6,080,501 | A | 6/2000 | Kelley et al. |
| 6,193,501 | B1 | 2/2001 | Masel et al. |
| 6,200,536 | B1 | 3/2001 | Tonkovich et al. |
| 6,245,214 | B1 | 6/2001 | Rehg et al. |
| 6,268,077 | B1 | 7/2001 | Kelley et al. |
| 6,312,846 | B1 | 11/2001 | Marsh |
| 6,406,808 | B1 | 6/2002 | Pratt et al. |
| 6,415,860 | B1 | 7/2002 | Kelly et al. |
| 6,423,434 | B1 | 7/2002 | Pratt et al. |
| 6,447,945 | B1 | 9/2002 | Streckert |
| 6,460,733 | B2 | 10/2002 | Acker et al. |
| 6,465,119 | B1 | 10/2002 | Koripella et al. |
| 6,470,569 | B1 | 10/2002 | Lippert et al. |
| 6,537,506 | B1 | 3/2003 | Schwalbe et al. |
| 6,541,676 | B1 | 4/2003 | Franz et al. |
| 6,569,553 | B1 | 5/2003 | Koripella et al. |
| 6,572,994 | B1 | 6/2003 | Shimotori et al. |
| 6,638,654 | B2 | 10/2003 | Jankowski et al. |
| 6,645,655 | B1 | 11/2003 | McNamee et al. |
| 6,660,680 | B1 | 12/2003 | Hampden-Smith et al. |
| 6,673,130 | B2 | 1/2004 | Jankowski et al. |
| 6,753,036 | B2 | 6/2004 | Jankowski et al. |
| 6,777,118 | B2 | 8/2004 | Shioya |
| 6,794,071 | B2 | 9/2004 | Beckmann et al. |
| 6,821,666 | B2 | 11/2004 | Morse et al. |
| 6,828,049 | B2 | 12/2004 | Bullock |
| 6,869,713 | B2 | 3/2005 | Kamo et al. |
| 6,913,998 | B2 | 7/2005 | Jankowski et al. |
| 6,916,568 | B2 | 7/2005 | Guan |
| 6,921,603 | B2 | 7/2005 | Morse et al. |
| 2001/0029974 | A1 | 10/2001 | Cohen et al. |
| 2002/0012825 | A1 | 1/2002 | Sasahara et al. |
| 2002/0045082 | A1 | 4/2002 | Marsh |
| 2002/0076599 | A1 | 6/2002 | Neutzler et al. |
| 2002/0081468 | A1 | 6/2002 | Shioya |
| 2002/0094462 | A1 | 7/2002 | Shioya et al. |
| 2002/0098119 | A1 | 7/2002 | Goodman |
| 2002/0106540 | A1 | 8/2002 | Shioya |
| 2002/0108740 | A1* | 8/2002 | Hidaka et al. ............... 165/135 |
| 2002/0127141 | A1 | 9/2002 | Acker |
| 2002/0131915 | A1 | 9/2002 | Shore et al. |
| 2002/0132156 | A1 | 9/2002 | Ruhl et al. |
| 2002/0147107 | A1 | 10/2002 | Abdo et al. |
| 2002/0150804 | A1 | 10/2002 | Srinivasan et al. |
| 2002/0155335 | A1 | 10/2002 | Kearl |
| 2002/0192537 | A1 | 12/2002 | Ren |
| 2003/0006668 | A1 | 1/2003 | Lal et al. |
| 2003/0027022 | A1 | 2/2003 | Arana et al. |
| 2003/0031910 | A1 | 2/2003 | Satou et al. |
| 2003/0031913 | A1 | 2/2003 | Pavio et al. |
| 2003/0057199 | A1 | 3/2003 | Villa et al. |
| 2003/0091502 | A1 | 5/2003 | Holladay et al. |
| 2003/0103878 | A1 | 6/2003 | Morse et al. |
| 2003/0129464 | A1 | 7/2003 | Becerra et al. |
| 2003/0157389 | A1 | 8/2003 | Kornmayer |
| 2003/0194363 | A1 | 10/2003 | Koripella |
| 2003/0194596 | A1* | 10/2003 | Ye et al. ............... 429/38 |
| 2003/0235726 | A1* | 12/2003 | Kelly et al. ............... 429/20 |
| 2004/0009381 | A1 | 1/2004 | Sakai et al. |
| 2004/0043273 | A1 | 3/2004 | Jankowski et al. |
| 2004/0048128 | A1 | 3/2004 | Jankowski et al. |
| 2004/0062961 | A1 | 4/2004 | Sato et al. |
| 2004/0062965 | A1 | 4/2004 | Morse et al. |
| 2004/0086755 | A1 | 5/2004 | Kalal |
| 2004/0096727 | A1 | 5/2004 | Kamo et al. |
| 2004/0166385 | A1 | 8/2004 | Morse et al. |
| 2004/0166395 | A1 | 8/2004 | Jankowski et al. |
| 2004/0175598 | A1 | 9/2004 | Bliven et al. |
| 2004/0211054 | A1 | 10/2004 | Morse et al. |
| 2004/0241521 | A1 | 12/2004 | Finkelshtain et al. |
| 2004/0253500 | A1 | 12/2004 | Bourilkov et al. |
| 2004/0265650 | A1 | 12/2004 | Koo |
| 2005/0008909 | A1 | 1/2005 | Kaye et al. |
| 2005/0008911 | A1 | 1/2005 | Kaye |
| 2005/0014059 | A1 | 1/2005 | Kaye |
| 2005/0053808 | A1 | 3/2005 | Chang et al. |
| 2005/0186455 | A1 | 8/2005 | Kaye et al. |
| 2005/0244685 | A1 | 11/2005 | Kim et al. |
| 2008/0057360 | A1* | 3/2008 | Kaye et al. ............... 429/17 |
| 2008/0213638 | A1* | 9/2008 | Brantley et al. ............... 429/19 |

FOREIGN PATENT DOCUMENTS

| | | | |
|---|---|---|---|
| EP | 0 914 687 | | 5/1999 |
| GB | 002405744 | | 3/2005 |
| JP | 02080301 | * | 3/1990 |
| JP | 10-162842 | | 6/1998 |

OTHER PUBLICATIONS

International Search Report and Written Opinion for corresponding PCT Patent Application No. PCT/US05/45456 dated Mar. 20, 2007.

S. Ahmed et al., "Catalytic Partial Oxidation Reforming of Hydrocarbon Fuels", Nov. 16-19, 1998, 1998 Fuel Cell Seminar, Palm Springs, CA.

A.R. Boccaccini et al., "Electrophoretic Deposition of Nanoceramic Particles onto Electrically Conducting Fibre Fabrics", Sep. 21-24, 1998, 43$^{rd}$ International Scientific Colloquium, Technical University of Ilmenau.

J. Bostaph et al., "1W Direct Methanol Fuel Cell System as a Desktop Charger", Oct. 14, 2002, Motorola Labs, Tempe, AZ.

K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.

M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.

S. Ehrenberg et al., "One Piece Bi-Polar (OPB) Plate with Cold Plate Cooling", Dec. 13, 2002, Session PEM R&D II (2A), Dais Analytic—Rogers.

T.M. Floyd et al., "Liquid-Phase and Multi-Phase Microreactors for Chemical Synthesis", Jun. 1999, Massachusetts Institute of Technology, Cambridge, MA.

A.J. Franz et al., "High Temperature Gas Phase Catalytic and Membrane Reactors", Jun. 1999, Massachusetts Institute of Technology, Cambridge, MA.

J.D. Holladay et al., "Miniature Fuel Processors for Portable Fuel Cell Power Supplies", Nov. 26, 2002, Battelle Pacific Northwest Division, Richland, WA.

S.W. Janson et al., "MEMS, Microengineering and Aerospace Systems", 1999, The American Institute of Aeronautics and Astronautics, Inc.

J. Kaschmitter et al., "Micro-Fabricated Methanol/Water Reformers for Small PEM Fuel Cell Systems", Jul. 21-24, 2003, 8$^{th}$ Electrochemical Power Sources R&D Symposium, Portsmouth, VA.

K. Keegan et al., "Analysis for a Planar Solid Oxide Fuel Cell Based Automotive Auxiliary Power Unit", Mar. 4-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3. No. 1, 13-18.

R. Kumar et al., "Solid Oxide Fuel Cell Research at Argonne National Laboratory", Mar. 29-30, 2001, 2$^{nd}$ Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.

Q. Li et al., "The CO Poisoning Effect in PEMFCs Operational at Temperatures up to 200° C", 2003, Journal of The Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.

D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the 5$^{th}$ International Conference on Microreaction Technology.

A. Pattekar et al., "Novel Microfluidic Interconnectors for High Temperature and Pressure Applications", 2003, Journal of Micromechanics and Microengineering, 13, 337-345.

D. Prater et al., "Systematic Examination of a Direct Methanol-Hydrogen Peroxide Fuel Cell", Sep. 22, 2001, Swift Enterprises, Ltd., Lafayette, IN.

W. Ruettinger et al., "A New Generation of Water Gas Shift Catalysts for Fuel Cell Applications", 2003, Journal of Power Sources, 118, 61-65.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

S. Tasic et al., "Multilayer Ceramic Processing of Microreactor Systems", Oct. 14, 2002, Motorola Labs, Tempe, AZ.

V. Toma§ićet al., "Development of the Structured Catalysts for the Exhaust Gas Treatment", 2001, Chem. Biochem. Eng. Q. 15 (3), 109-115.

TIAX LLC, "Advanced Hydrogen Storage: A System's Perspective and Some Thoughts on Fundamentals", Aug. 14-15, 2002, Presentation for DOE Workshop on Hydrogen Storage, Cambridge, MA.

Wan et al., "Catalyst Preparation: Catalytic Converter", Feb. 19, 2003, www.insightcentral.net/encatalytic.html.

J. Zalc et al., "Are Noble Metal-Based Water-Gas Shift Catalysts Practical for Automotive Fuel Processing?", 2002, Journal of Catalysis, 206, 169-171.

J. Zizelman et al., "Solid-Oxide Fuel Cell Auxiliary Power Unit: A Paradigm Shift in Electric Supply for Transportation", undated, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

International Search Report, dated Apr. 4, 2005.

Chinese Office Action dated Jun. 20, 2008 from CN Patent Application No. 200480024523.4.

Chinese Office Action Dated Jan. 16, 2009 from Chinese Application No. 200580048212.6.

European Extended Search Report dated Sep. 9, 2009 from European Patent Application No. 05854219.2.

Chinese Office Action dated Sep. 25, 2009 from Chinese Patent Application No. 200580048212.6.

* cited by examiner

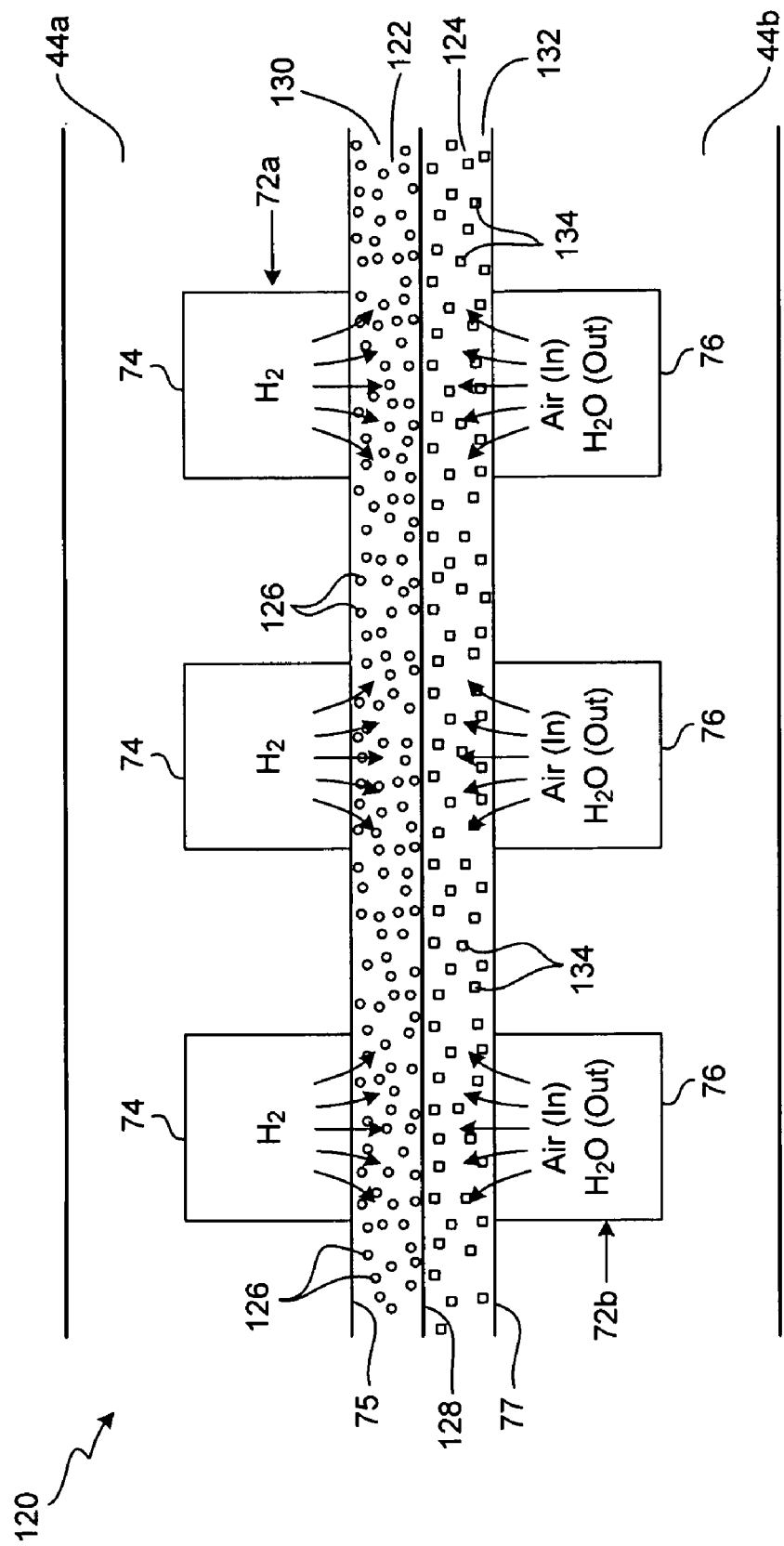

COMPACT FUEL CELL PACKAGE

CROSS-REFERENCE TO RELATED APPLICATIONS

This application claims priority under 35 U.S.C. §119(e) to U.S. Provisional Patent Application No. 60/638,421 filed on Dec. 21, 2004 entitled "Micro Fuel Cell Architecture", which is incorporated by reference for all purposes.

BACKGROUND OF THE INVENTION

The present invention relates to fuel cell technology. In particular, the invention relates to fuel cell systems included in a compact and portable package suitable for powering portable electronic devices.

A fuel cell electrochemically combines hydrogen and oxygen to generate electrical energy. Fuel cell development so far has concentrated on large-scale applications such as industrial size generators for electrical power back up. Consumer electronics devices and other portable electrical power applications currently rely on lithium ion and similar battery technologies. Fuel cell systems that generate electrical energy for portable applications such as electronics would be desirable, but are not yet commercially available. In addition, technology advances that reduce fuel cell system size would be beneficial.

SUMMARY OF THE INVENTION

The present invention relates to a compact and portable fuel cell package. The package includes a fuel cell that generates electrical energy. Some packages also include a fuel processor that produces hydrogen from a fuel source. Fuel cell packages described herein provide power densities (power per unit volume or mass) at levels not yet seen in the fuel cell industry. For example, one portable fuel cell package—including both a fuel cell and fuel processor—occupies less than one liter and provides 30 Watts of electrical output. Lesser volumes and different electrical outputs are possible with packages described herein.

One package employs an interconnect disposed at least partially between a fuel cell and a fuel processor. The interconnect forms a structural and plumbing intermediary between the two. One or more conduits traverse the interconnect and permit gaseous and/or fluid communication between the fuel cell and the fuel processor. The interconnect reduces plumbing complexity and space, which leads to a smaller package.

Some fuel cell packages are designed to power an electronics device. Given the portability of fuel cell packages described herein, the invention is well suited to power portable electronics devices such as laptop computers.

One fuel cell package includes a tether. The tether allows electrical and detachable coupling with an electronics device so as to supply energy generated by the fuel cell, or to supply energy stored in a rechargeable battery included in the package and charged by the fuel cell.

The fuel cell package may also include insulation to decrease heat loss from the fuel cell and fuel processor, which both typically operate at elevated temperatures. The insulation increases thermal efficiency of the package.

In one aspect, the present invention relates to a fuel cell package for providing electrical energy. The fuel cell package includes a fuel cell configured to receive hydrogen and oxygen and to generate electrical energy. The fuel cell package provides a power density of greater than about 30 Watts/liter according to a volume of the fuel cell package.

In another aspect, the present invention relates to a fuel cell package that produces electrical energy from a fuel source, such as methanol. The fuel cell package comprises a fuel processor that includes a reformer and a heater. The reformer receives the fuel source, outputs hydrogen, and includes a catalyst that facilitates the production of hydrogen from the fuel source. The heater generates heat for transfer to the reformer. The package also includes a fuel cell that generates electrical energy using hydrogen output by the fuel processor.

In yet another aspect, the present invention relates to a compact fuel cell package. The fuel cell package includes a fuel processor, a fuel cell and an interconnect disposed at least partially between the fuel cell and the fuel processor. The interconnect includes a set of conduits that each communicate a liquid or gas between the fuel processor and the fuel cell.

In still another aspect, the present invention relates to a tethered fuel cell package. The tethered package includes a fuel cell and a housing that at least partially contains the fuel cell. The package also includes a tether capable of electrical coupling to an electronics device and transmitting electricity generated by the fuel cell to the electronics device.

In another aspect, the present invention relates to an insulated fuel cell package. The package includes a fuel cell, a housing, and insulation disposed at least partially between the fuel cell and the housing.

In yet another aspect, the present invention relates to an interconnect for use in a fuel cell package that includes a fuel processor and a fuel cell. The interconnect is disposed at least partially between the fuel cell and the fuel processor and includes a set of conduits that each communicate a liquid or gas between the fuel processor and the fuel cell. The set of conduits includes a hydrogen conduit that receives hydrogen from a hydrogen channel in the fuel processor and outputs the hydrogen to a hydrogen channel in the fuel cell.

These and other features and advantages of the present invention will be described in the following description of the invention and associated figures.

BRIEF DESCRIPTION OF THE DRAWINGS

FIG. 2C illustrates an ion conductive membrane fuel cell (PEMFC) architecture for the fuel cell of FIG. 1A in accordance with one embodiment of the present invention.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Fuel Cell Package

Figure 1A:
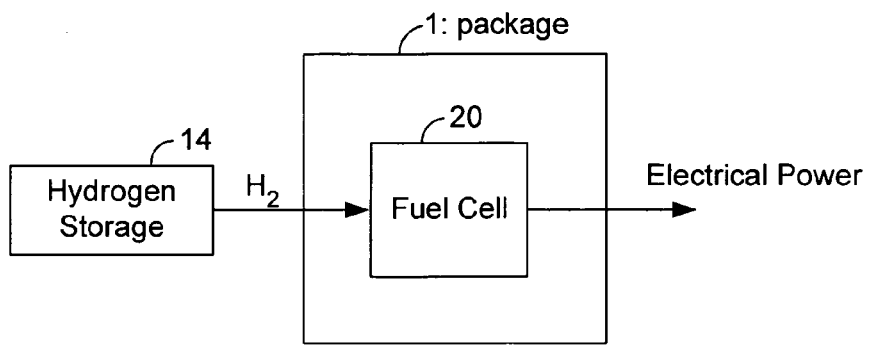
FIG. 1A illustrates a fuel cell package for producing electrical energy in accordance with one embodiment of the present invention.

FIG. 1A illustrates a fuel cell package 1 for producing electrical energy in accordance with one embodiment of the present invention. Fuel cell package 1 comprises a fuel cell 20 and couples to hydrogen storage 14.

Hydrogen storage device 14 stores and outputs hydrogen, which may be a pure source such as compressed hydrogen held in a pressurized container 14. Hydrogen storage device 14 may also include a solid-hydrogen storage system such as a metal-based hydrogen storage device known to those of skill in the art. An outlet of hydrogen storage device 14 detachably couples to fuel cell 20 so that storage device 14 may be replaced when depleted.

Fuel cell 20 electrochemically converts hydrogen and oxygen to water, generating electrical energy and heat in the process. Ambient air commonly supplies oxygen for fuel cell 20. A pure or direct oxygen source may also be used for oxygen supply. The water often forms as a vapor, depending on the temperature of fuel cell 20 components. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. An ion conductive membrane fuel cell comprises a membrane electrode assembly that carries out the electrical energy generating electrochemical reaction. The membrane electrode assembly includes a hydrogen catalyst, an oxygen catalyst and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. A membrane electrode assembly is disposed between two bi-polar plates. Hydrogen distribution occurs via a channel field on one plate while oxygen distribution occurs via a channel field on a second plate on the other side of the membrane electrode assembly. Specifically, a first channel field distributes hydrogen to the hydrogen gas distribution layer, while a second channel field distributes oxygen to the oxygen gas distribution layer. The term 'bi-polar' refers electrically to a bi-polar plate (whether comprised of one plate or two plates) sandwiched between two membrane electrode assembly layers. In the stack, the bi-polar plate acts as both a negative terminal for one adjacent (e.g., above) membrane electrode assembly and a positive terminal for a second adjacent (e.g., below) membrane electrode assembly arranged on the opposite face of the bi-polar plate.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add electrical potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst separates the hydrogen into protons and electrons. An ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates formed from a single plate. Each plate includes channel fields on opposite surfaces of the plate. The single bi-polar plate thus dually distributes hydrogen and oxygen: one channel field distributes hydrogen while a channel field on the opposite surface distributes oxygen. Multiple bi-polar plates can be stacked to produce a 'fuel cell stack' in which a membrane electrode assembly is disposed between each pair of adjacent bi-polar plates.

Since the electrical generation process in fuel cell 20 is exothermic, fuel cell 20 may implement a thermal management system to dissipate heat from the fuel cell. Fuel cell 20 may also employ a number of humidification plates (HP) to manage moisture levels in the fuel cell. Further description of a fuel cell suitable for use with the present invention is included in commonly owned co-pending patent application Ser. No. 10/877,824 entitled "Micro Fuel Cell Architecture", which is incorporated by reference for all purposes.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may be applicable to the space saving designs described herein. Other such fuel cell architectures include direct methanol, alkaline and molten carbonate fuel cells, for example.

Fuel cell 20 generates dc voltage, which may be used in a wide variety of applications. For example, electrical energy generated by fuel cell 20 may power a motor or light. In one embodiment, the present invention provides 'small' fuel cells that are configured to output less than 200 watts of power (net or total). Fuel cells of this size are commonly referred to as 'micro fuel cells' and are well suited for use with portable electronics devices. In one embodiment, fuel cell 20 is configured to generate from about 1 milliwatt to about 200 Watts. In another embodiment, fuel cell 20 generates from about 5 Watts to about 60 Watts. Fuel cell 20 may be a stand-alone fuel cell, which is a single package that produces power as long as it has access to a) oxygen and b) hydrogen or a hydrocarbon fuel supply. A stand-alone fuel cell 20 that outputs from about 10 Watts to about 100 Watts is well suited to power a laptop computer. One specific fuel cell package produces greater than about 10 Watts. Another specific fuel cell package produces greater than about 45 Watts.

Figure 1B:
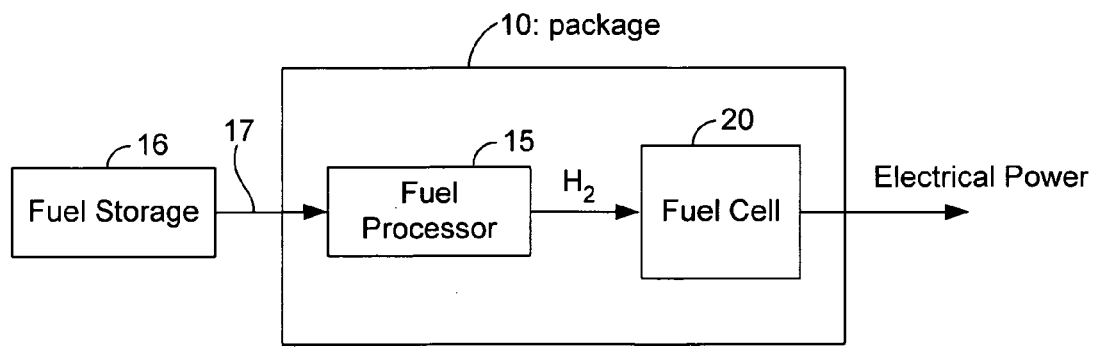
FIG. 1B illustrates a fuel cell package including a fuel processor in accordance with another embodiment of the present invention.

A fuel cell package of the present invention may also use a 'reformed' hydrogen supply. FIG. 1B illustrates a fuel cell package 10 for producing electrical energy in accordance with another embodiment of the present invention. Fuel cell package 10 comprises a fuel processor 15 and a fuel cell 20.

Processor 15 processes a fuel source 17 to produce hydrogen. Fuel source 17 acts as a carrier for hydrogen and can be manipulated to separate hydrogen. Fuel source 17 may include any hydrogen bearing fuel stream, hydrocarbon fuel, or other hydrogen fuel source such as ammonia. Currently available hydrocarbon fuel sources 17 suitable for use with the present invention include methanol, ethanol, gasoline, propane, butane and natural gas, for example. Liquid fuel sources 17 offer high energy densities and the ability to be readily stored and shipped. Other fuel sources may be used with a fuel cell package of the present invention, such as sodium borohydride. Several hydrocarbon and ammonia products may also produce a suitable fuel source 17.

Fuel source 17 may be stored as a fuel mixture. When the fuel processor 15 comprises a steam reformer, storage device 16 contains a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%-99.9%. Other liquid fuels such as butane, propane, gasoline, military grade "JP8" etc. may also be contained in storage device 16 with concentrations in water from 5-100%. In a specific embodiment, fuel source 17 includes 67% methanol by volume.

As shown, the reformed hydrogen supply comprises a fuel processor 15 and a fuel source storage device 16. Storage device 16 stores fuel source 17, and may comprise a portable and/or disposable fuel cartridge. A disposable cartridge offers a user instant recharging. In one embodiment, the cartridge includes a collapsible bladder within a hard protective case. A fuel pump typically moves fuel source 17 from storage device 16 to the processor 15. If package 10 is load following, then a control system meters fuel source 17 to deliver fuel source 17 to processor 15 at a flow rate determined by a desired power level output of fuel cell 20.

Fuel processor 15 processes the hydrocarbon fuel source 17 and outputs hydrogen. A hydrocarbon fuel processor 15 heats and processes a hydrocarbon fuel source 17 in the presence of a catalyst to produce hydrogen. Fuel processor 15 comprises a reformer, which is a catalytic device that converts a liquid or gaseous hydrocarbon fuel source 17 into hydrogen and carbon dioxide. As the term is used herein, reforming refers to the process of producing hydrogen from a fuel source. One suitable fuel processor 15 is described in further detail below.

In one embodiment, fuel processor 15 is a steam reformer that only needs steam and fuel to produce hydrogen. Several types of reformers suitable for use in fuel cell package 10 include steam reformers, auto thermal reformers (ATR) or catalytic partial oxidizers (CPOX). ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell package 10 use in applications where temperature is to be minimized.

A fuel cell 20 may be configured to receive hydrogen from either a direct hydrogen supply 12 or a reformed source. Fuel cell 20 typically receives hydrogen from one supply at a time, although fuel cell packages that employ redundant hydrogen provision from multiple supplies are useful in some applications.

Figure 1C:
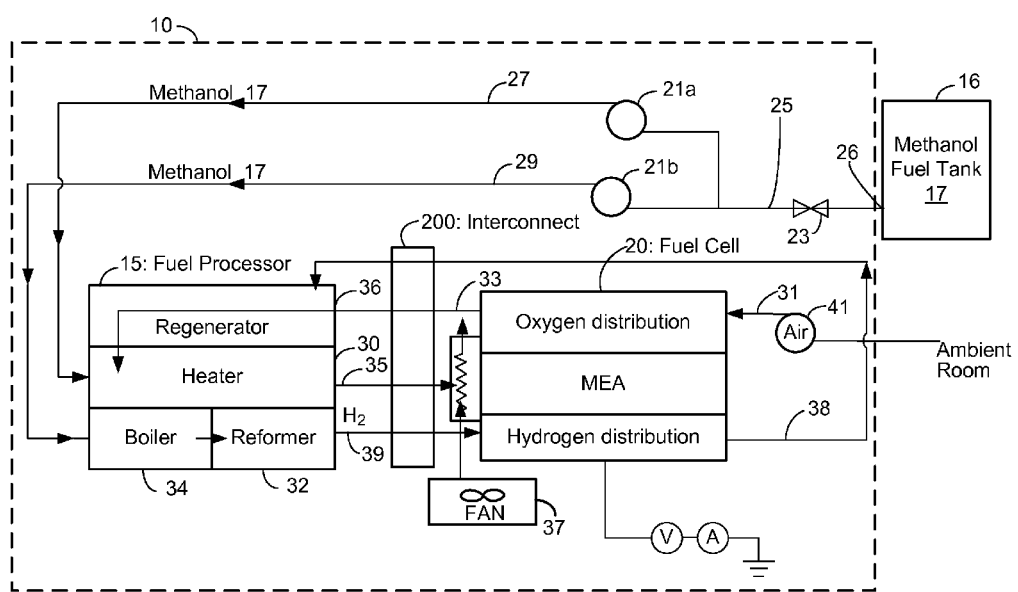
FIG. 1C illustrates schematic operation for the fuel cell package of FIG. 1B in accordance with a specific embodiment of the present invention.

FIG. 1C illustrates schematic operation for the fuel cell package 10 of FIG. 1B in accordance with a specific embodiment of the present invention. As shown, package 10 includes fuel processor 15, fuel cell 20, multiple pumps 21, an air pump 41, various fuel conduits and gas conduits, and one or more valves 23. A fuel container 16 couples to package 10 and stores a hydrogen fuel source 17 for supply to components within package 10.

Fuel container 16 stores methanol as a hydrogen fuel source 17. An outlet 26 of fuel container 16 provides, methanol 17, into hydrogen fuel source conduit 25. As shown, conduit 25 divides into two conduits: a first conduit 27 that transports methanol 17 to a heater (also referred to herein as a 'burner') 30 for fuel processor 15 and a second conduit 29 that transports methanol 17 to a reformer 32 in fuel processor 15. Conduits 25, 27 and 29 may comprise channels disposed in the fuel processor or tubes leading thereto, for example. Separate pumps 21a and 21b are provided for conduits 27 and 29, respectively, to pressurize the conduits and transfer methanol at independent rates, if desired. A model 030SP-S6112 pump as provided by Biochem, NJ is suitable to transmit liquid methanol for system 10 is suitable in this embodiment.

In one embodiment, the pump is positive displacement and the system does not use a flow meter. In this case, the control system knows how much fuel is being pumped, and the control system communicates this information to a chip on the fuel cartridge. In another embodiment, a flow sensor or valve 23, situated between storage device 16 and fuel processor 18, detects and communicates the amount of methanol 17 transfer between storage device 16 and reformer 32. In conjunction with the sensor or valve 23 and suitable control, such as digital control applied by a processor that implements instructions from stored software, pump 21b regulates methanol 17 provision from storage device 16 to reformer 32.

Air pump 41 delivers oxygen and air from the ambient room through conduit 31 to the cathode in the fuel cell 20, where some oxygen is used in the cathode to generate electricity. Air pump 41 may include a fan or compressor, for example. High operating temperatures in fuel cell 20 also heat the oxygen and air. In the embodiment shown, the heated oxygen and air is then transmitted via conduit 33 to regenerator 36 of fuel processor 15, where it is additionally heated before entering heater 30. This double pre-heating increases efficiency of the fuel cell system by a) reducing heat lost to reactants in heater 30 (such as fresh oxygen that would otherwise be near room temperature), b) cooling the fuel cell during energy production. In this embodiment, a model BTC compressor as provided by Hargraves, NC is suitable to pressurize oxygen and air for fuel cell system 10.

A fan 37 blows cooling air (e.g. from the ambient room) over fuel cell 20 and its heat transfer appendages 46. Fan 37 may be suitable sized to move air as desired by heating requirements of the fuel cell; and many vendors known to those of skill in the art provide fans suitable for use with package 10. An additional fan may be used to blow air over a heater section of the fuel cell heat transfer appendages.

Fuel processor 15 receives methanol 17 from storage device 16 and outputs hydrogen. Fuel processor 15 comprises heater 30, reformer 32, boiler 34 and regenerator 36. Heater (or burner) 30 includes an inlet (which also functions as a boiler if methanol is present) that receives methanol 17 from conduit 27 and a catalyst that generates heat with methanol presence. Boiler 34 includes an inlet that receives methanol 17 from conduit 29. The structure of boiler 34 permits heat produced in heater 30 to heat methanol 17 in boiler 34 before reformer 32 receives the methanol 17. Boiler 34 includes an outlet that provides heated methanol 17 to reformer 32. Reformer 32 includes an inlet that receives heated methanol 17 from boiler 34. A catalyst in reformer 32 reacts with the methanol 17 and produces hydrogen and carbon dioxide (along with about −0.2-5% CO and any un-reacted methanol and steam). This reaction is slightly endothermic and draws heat from heater 30. A hydrogen outlet of reformer 32 outputs hydrogen to conduit 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum, that is preferential to carbon monoxide over hydrogen.

Regenerator 36 pre-heats air before the air enters heater 30. Regenerator 36 also reduces heat loss from package 10 by heating air before it escapes fuel processor 15. In one sense, regenerator uses waste heat in fuel processor 15 to increase thermal management and thermal efficiency of the fuel processor. Specifically, waste heat from heater 30 may be used to pre-heat incoming air provided to heater 30 to reduce heat transfer to the air in the heater so more heat transfers to reformer 32. The regenerator also functions as insulation for the fuel processor, by reducing the overall amount of heat loss of the reformer.

Conduit 39 transports hydrogen from fuel processor 15 to fuel cell 20. Gaseous delivery conduits 31, 33 and 39 may comprise channels in metal, as will be described below. A hydrogen flow sensor (not shown) may also be added on conduit 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from conduit 39 and delivers it to a hydrogen intake manifold for delivery to one or more bi-polar plates and their hydrogen distribution channels. An oxygen inlet port of fuel cell 20 receives oxygen from conduit 31 and delivers it to an oxygen intake manifold for delivery to one or more bi-polar plates and their oxygen distribution channels. An anode exhaust manifold 38 collects gases from the hydrogen distribution channels and delivers them to the ambient room, or back to the fuel processor. A cathode exhaust manifold collects gases from the oxygen distribution channels and delivers them to a cathode exhaust port and conduit 33, or to the ambient room.

In addition to the components shown in shown in FIG. 1C, system 10 may also include other elements such as electronic controls, additional pumps and valves, added system sensors, manifolds, heat exchangers and electrical interconnects useful for carrying out functionality of a fuel cell system 10 that are known to one of skill in the art and omitted herein for sake of brevity.

Package

The present invention provides a reduced-size and portable fuel cell package. As the term is used herein, a fuel package refers to a fuel cell system that receives hydrogen, or a hydrogen fuel source, and outputs electrical energy. At a minimum, this includes a fuel cell. The package need not include a cover or housing, e.g., in the case where a fuel cell, or a fuel cell and fuel processor, is included in a battery bay of a laptop computer. In this case, the fuel cell package only includes the fuel cell, or fuel cell and fuel processor, and no housing. The package may include a compact profile, low volume, or low mass—any of which is useful in any power application where size is relevant. As the term is used herein, fuel cell package and fuel cell system are synonymous, where package is used to more conveniently express volume and power density.

In one embodiment, the fuel cell package includes a fuel cell, a fuel processor, and dedicated connectivity between the two. The dedicated connectivity may provide a) fluid or gas communication between the fuel processor and the fuel cell, and/or b) structural support between the two or for the package. In one embodiment, an interconnect as described below provides much of the connectivity. In another embodiment, direct and dedicated connectivity is provided on the fuel cell and/or fuel processor to interface with the other. For example, a fuel cell may be designed to interface with a particular fuel processor and includes dedicated connectivity for that fuel processor. Alternatively, a fuel processor may be designed to interface with a particular fuel cell. Assembling the fuel processor and fuel cell together in a common and substantially enclosed package provides a portable 'black box' package that receives a hydrogen fuel source and outputs electrical energy.

One or more conduits or channels communicate gases or fluids between the fuel cell and fuel processor. At the least, the communication includes a line that transports hydrogen to the fuel cell. To reduce package size, the fuel cell and the fuel processor may each include a molded channel dedicated to the delivering hydrogen from the processor to the cell. The channeling may be included in structure for each. When the fuel cell attaches directly to the fuel processor, the hydrogen transport line then includes a) channeling in the fuel processor to deliver hydrogen from a reformer to the connection, and b) channeling in the fuel cell to deliver the hydrogen from the connection to a hydrogen intake manifold. An interconnect as described below may facilitate connection between the fuel cell and the fuel processor. In this case, the interconnect includes an integrated hydrogen conduit dedicated to hydrogen transfer from the fuel processor to the fuel cell.

Figure 4A:
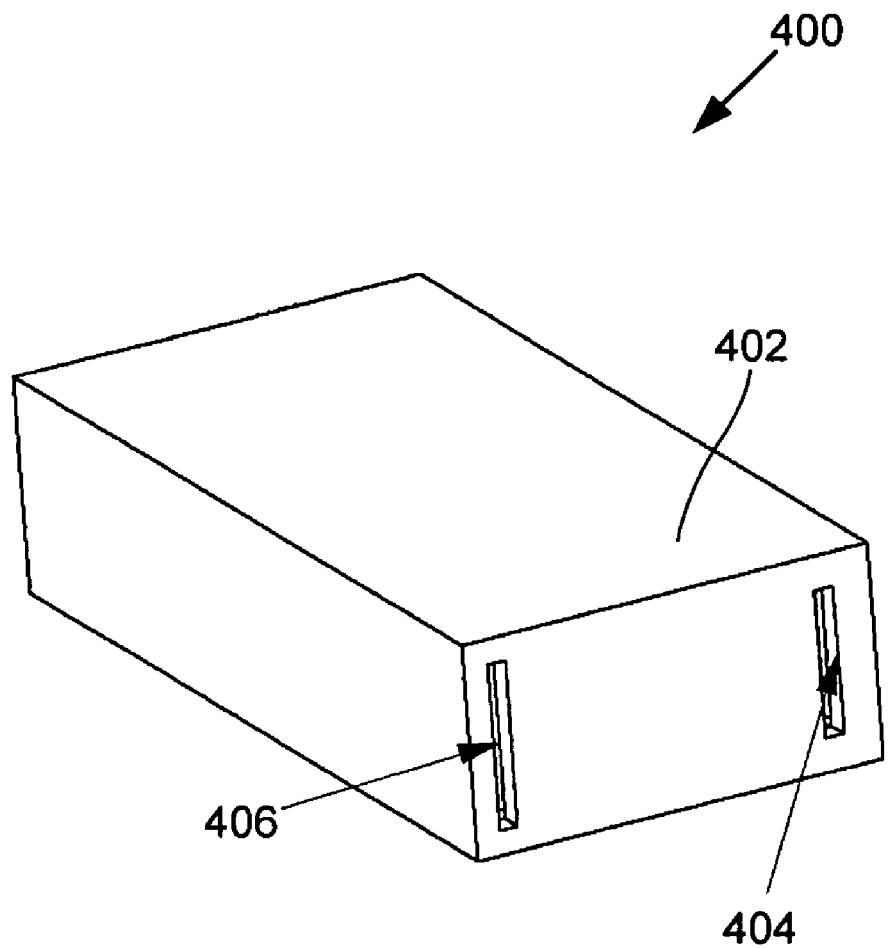
FIG. 4A illustrates an outer perspective view of a fuel cell package in accordance with one embodiment of the present invention.

FIG. 4A illustrates a fuel cell package 400 in accordance with one embodiment of the present invention. Package 400 provides compact and portable electrical energy generation using fuel cell technology.

An outer housing 402 contains a fuel cell. Housing 402 provides mechanical protection for internal components within its boundaries, and may include any shape or configuration to provide such protection. In one embodiment, housing 402 includes multiple pieces secured together using screws and/or a suitable adhesive. Materials used in housing 402 may include any suitably stiff material that provides mechanical protection. For example, a rigid plastic or metal may be used for housing 402. In one embodiment, housing 402 includes a low thermal conductance material so that the housing does not act as a heat sink for heat generation within its volume. In another embodiment, housing 402 includes a thermally conductive material. In one embodiment, housing 402 is dimensioned according to the internal components contained therein to reduce overall package volume.

Housing 402 includes a number of openings for air intake and exhaust. Opening 404 allows air from the ambient room or environment to enter package 400, e.g., to cool a fuel cell contained therein or for energy generation in the fuel cell. Opening 406 acts as an exhaust port for heated gases after they acquire heat from the fuel cell, which typically operates at an elevated temperature relative to air in the ambient environment. While openings 404 and 406 are shown as somewhat linear slits, the openings may comprise any dimensions suitable for intake and exhaust of cooling air (or oxygen used in a fuel processor). In addition, the package may include less or greater than two openings.

Not all fuel cell system components are necessarily included within housing 402. While housing 402 is useful to characterize volume, some packages that resemble embedded systems do not include a housing 402. Alternatively, components that interface with a detachable hydrogen or fuel source storage device may be configured outside of housing 402. At the least, housing 402 at least partially contains the fuel cell. The housing 402 also usually contains the fuel processor, if one is included in the system.

Volume may characterize package 400. The volume includes all components of the package used in the system to generate electricity, save a storage device used to supply hydrogen or a fuel source. In one embodiment, the volume includes the fuel cell and any components external to housing 402 used to generate electricity (e.g., not just components included within housing 402, such as a pump used for fuel delivery disposed partially outside the housing), and/or a power conditioner that converts the fuel cell output voltage to a level required by a power consumer and which may be turned on or off by the fuel cell control system as needed. In one embodiment, package 400 has a total volume less than about a liter. In a specific embodiment, package 400 has a total volume less than about ½ liter. Greater and lesser package volumes may be used with the present invention.

Package also includes a relatively small mass. In one embodiment, package 400 has a total mass less than about a 1 kg. In a specific embodiment, package 400 has a total volume less than about ½ liter. Greater and lesser package masses are possible.

Power density may also be used to characterize a fuel cell package. Power density refers to the ratio of electrical power output provided by a fuel cell included in the package relative to a physical parameter such as volume or mass of the package. Notably, the present invention provides fuel cell packages with power densities not yet attained in the fuel cell industry. In one embodiment, fuel cell package 400 provides a power density of greater than about 30 Watts/liter. This package includes all balance of plant items (cooling system, power conversion, start-up battery, etc.) except the fuel and fuel source storage device. In another specific embodiment, fuel cell package 400 provides a power density of greater than about 60 Watts/liter. A power density from about 45 Watts/liter to about 90 Watts/liter works well for many portable applications. Greater and lesser power densities are also permissible with a fuel cell package of the present invention.

A fuel cell and fuel processor may be arranged in a package so as to minimize package volume. In one embodiment, the fuel processor and fuel cell are arranged to be coplanar in the package. Coplanar in this sense refers to the shortest and/or longest dimension used to characterize the fuel cell and to characterize the fuel processor being aligned in the same axis. The shortest dimension refers to the smallest dimension of three dimensions (e.g., x, y, z) used to characterize size of either component. The longest dimension conveys the opposite. For example, if height for both the fuel cell and fuel processor is the smallest dimension, then the fuel cell and fuel processor are placed adjacent and coplanar to each other such that height for both is in a common direction (e.g., z). The fuel cell and fuel processor may be arranged beside each other, stacked on top of each other, or in any other arrangement that reduces volume. When arranged beside each other, height of the taller of the two determines overall height of the package. In one embodiment, the fuel cell system package has a height determined by the fuel cell. In a specific embodiment, the fuel cell and package has a height less than about 1 inch. Other heights are contemplated, such as less than about 2 inches, or the height of a battery slot in a laptop computer.

Figure 4B:
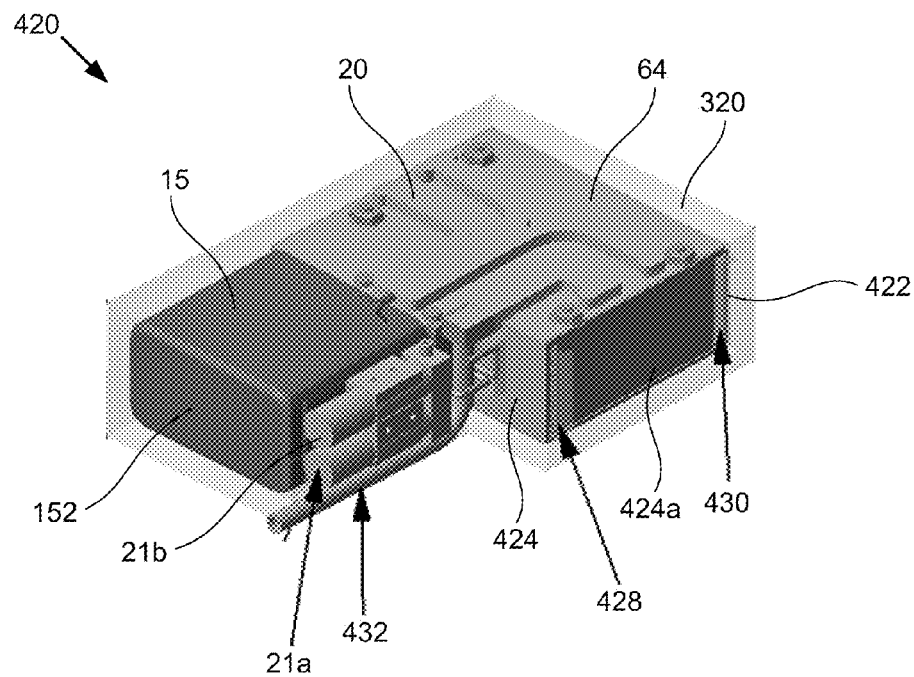
FIG. 4B shows a perspective view of internal components of a coplanar fuel cell package in accordance with a specific embodiment of the present invention.

FIG. 4B shows a perspective view of a coplanar fuel cell system in a single package 420 in accordance with one embodiment of the present invention. Package 420 includes fuel cell 20 and fuel processor 15, arranged adjacent to each other such that their heights are substantially parallel.

Fuel cell 20 is shown with a housing 422 that includes top plate 64 and a number of sidewalls 424. Sidewall 424a includes two openings: a cooling air intake 428 and an exhaust 430. Cooling fan 37 of FIG. 1C is disposed relatively close and internal to intake 428 or exhaust 430.

For package 420, fuel pumps 21 are included for plumbing control and attached to an external housing of the package.

Fuel pumps 21 may employ a solenoid pump, syringe pump or any other commercially available pump that moves a fuel. FIG. 4B also shows an air intake pipe 432 (line 31 of FIG. 1C) that communicates oxygen and air from the ambient room or environment, through the package housing, and to fuel cell 20 for use in the cathode.

Orthogonal dimensions of length (L), width (W) and height (H) characterize package 420. In one embodiment, package 420 includes a length between about 6 cm and about 15 cm, a width between about 4 cm and about 10 cm, and a height between about 1 cm and about 5 cm. As one of skill in the art will appreciate, package dimensions will depend on the arrangement and size of fuel cell 20 and fuel processor 15, and whether a fuel processor 15 is even included in the package. Exclusion of fuel processor 15 reduces dimensions for package 420 by the dimensions of the processor and its associated balance of plant requirements. In a specific embodiment, package 420 includes a length between about 11 cm and about 13 cm, a width between about 7 cm and about 9 cm, and a height between about 2 cm and about 4 cm. Greater and lesser dimensions may be used for a package of the present invention.

Figure 4C:
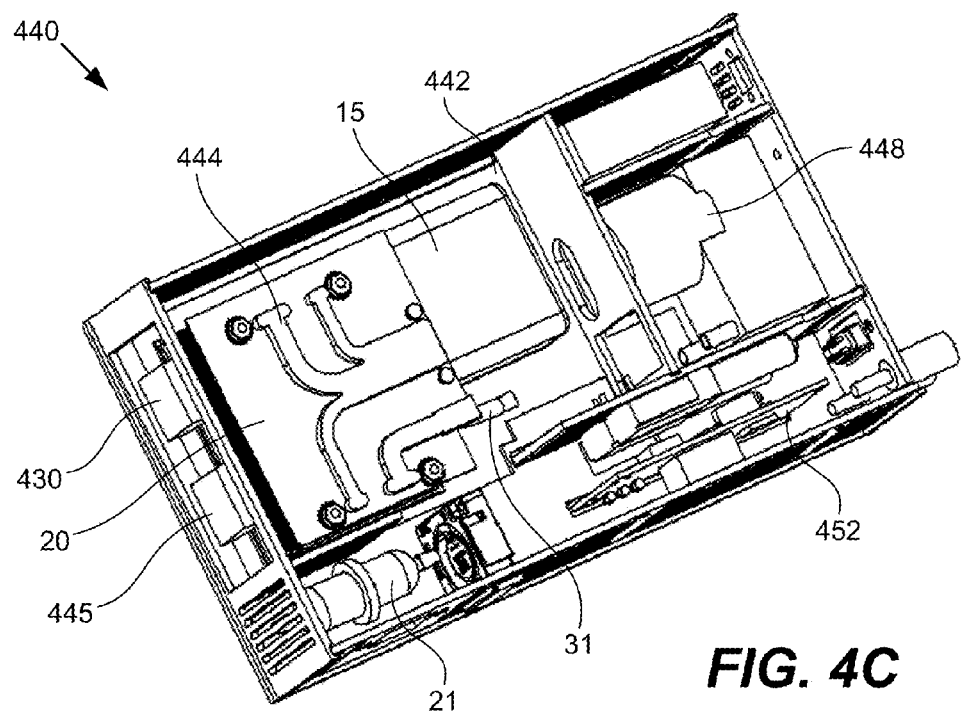
FIG. 4C illustrates a perspective view of internal components for a fuel cell package in accordance with another specific embodiment of the present invention.

FIG. 4C illustrates a perspective view of internal components for a fuel cell package 440 in accordance with another embodiment of the present invention.

Package 440 includes a block chassis 442 that acts as a structural framework to which functional components of package 440 are attached. In one embodiment, chassis 442 forms a bottom wall of an external housing for package 440. Chassis 442 includes a suitably stiff material, such as a metal or rigid plastic. Aluminum, $Fr_4$, carbon fiber, ABS and steel are all suitable for use. Alternatively, any material that provides mechanical integrity and includes a low thermal conductance may be used.

Package 440 also includes fluid conduits and connections 444 incorporated into fuel cell 20 and fuel processor 15, as opposed to separate tubes and hoses between the fuel cell 20 and processor 15. This decreases size for package 440. Pump 21 provides fuel source movement and is coupled to a bracket that attaches to chassis 442. An air compressor 448 provides air to the fuel cell cathode and is attached to chassis 442. An intake plenum 445 is included to guide air between an outer housing of package 440 and inlet port 428 of fuel cell 20.

Package 440 also includes a rechargeable battery (not shown on drawing). In one embodiment, battery is used during startup to provide electrical power for heating fuel in fuel processor 15 until the fuel processor and fuel cell 20 are ready to generate electrical energy. Then, the rechargeable battery may be recharged by fuel cell 20. If rechargeable battery is empty, the fuel cell system may employ a USB jumpstart (the battery can be charged by devices other than the fuel cell, and the system can be started by devices other than the system battery). In this case, a USB connection between package 440 and an electronics device such as a laptop computer provides power to charge the system battery until it reaches a state of charge so that it can heat fuel for fuel processor 15 until fuel cell 20 generates electrical energy. At this point, battery may be recharged by the fuel cell. A wide variety of vendors known to those of skill in the art provide rechargeable batteries suitable for use with the present invention. A 2.4 Amp Hour 18650 rechargeable battery is suitable for some embodiments. A battery that provides 18 watts at 50% charge and 3.75 volts is also suitable. Other commercially available batteries may be used.

Control board 452 includes suitable software and hardware for controlling components within package 440. Hardware may include a commercially available processor, such as any of those available in the Intel, MicroChip or Motorola family of processors. Some form of memory is also included. Random-access memory (RAM) and read-only memory (ROM) may be included to store program instructions, implemented by the processor, that execute control functions for one more components of a fuel cell system. The control board may also include a device to allow for reprogramming of the control system firmware without the need to remove the control board.

An electrical adapter may also be included in the package (not shown in FIG. 4C, and can also be part of control board 452) converts electrical energy output by fuel cell 20 to a suitable level as determined by design of package 440. For example, package 440 may be used as a tethered adapter to power a laptop computer, in which electrical adapter converts electrical energy output by fuel cell 20 to a voltage and current suitable for electrical provision to the laptop. DC/DC conversion is typical, but other power conditioning may also be applied. The electrical adaptor, or power regulator, may also have the capability to be turned on or off as needed, and may include load leveling capabilities such as provided by capacitors on the input and output lines. In one embodiment, the electrical adaptor has an electrical efficiency greater than about 90%. In a specific embodiment, the electrical adaptor has an efficiency greater than about 95%. Other devices may be powered by fuel cell 20, and adapter will be configured according to electrical requirements of the device. Adapter may also include a hardware interface that receives a wire that couples to the electronics device.

Package 440 may also includes additional fuel cell system components such as a cathode air inlet 31, a fuel feed from a detachable fuel source cartridge that couples to package 440, and a sensor and wires for temperature sensing.

Although fuel cell packages have been largely described with respect to fuel processor inclusion, a package of the present invention need not include a processor. In another embodiment, the package only includes a fuel cell that receives hydrogen from a supply coupled to the package. The package then provides a portable black box that receives hydrogen and outputs electrical energy. Since the volume has decreased, this provides fuel cell packages with less volume and mass—for the same power output—and thus even greater power densities.

Figure 7A:
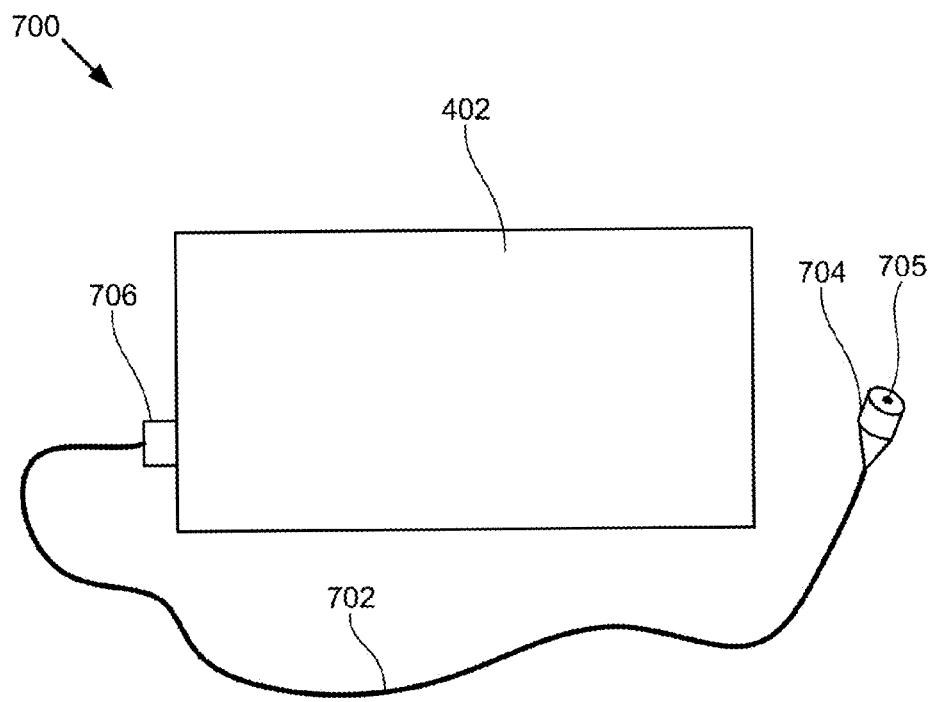
FIG. 7A shows a simplified illustration of a tethered fuel cell package in accordance with one embodiment of the present invention.
Figure 7B:
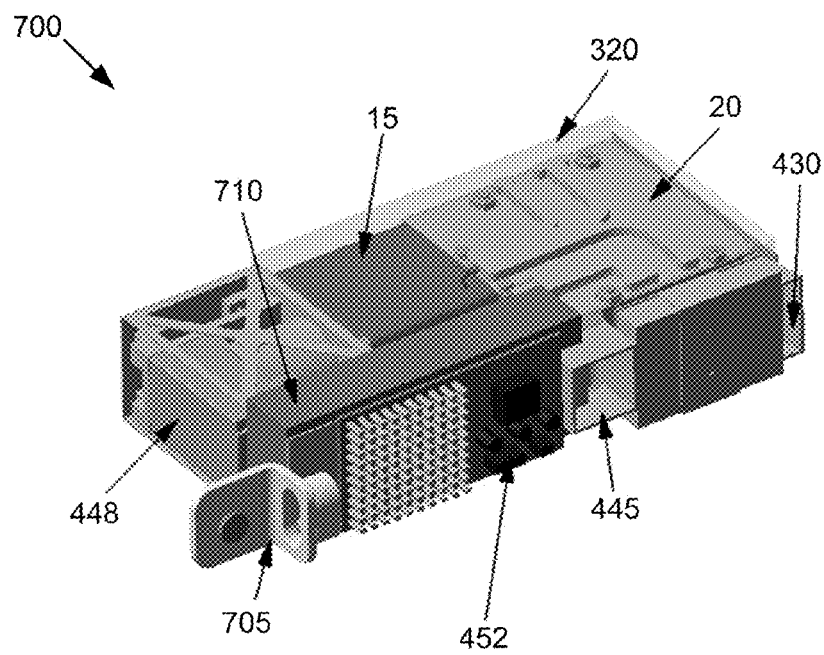
FIG. 7B illustrates an internal perspective view of the tethered fuel cell package of FIG. 7A in accordance with a specific embodiment of the present invention.

In one embodiment, the present invention provides a tethered fuel cell package. FIG. 7A shows a simplified illustration of a tethered fuel cell package 700 in accordance with one embodiment of the present invention. FIG. 7B illustrates an internal perspective view of tethered fuel cell package 700 in accordance with a specific embodiment of the present invention.

A tethered package refers to a fuel cell package including a tether 702. Tether 702 allows electrical coupling to the package from a distance, and typically includes a conductor capable of communicating electrical energy from a fuel cell or electrical adapter included in the package 700 to an electronics device. In one embodiment, tether 702 includes a wire detachably coupled to package 700 and configured to transmit DC electricity generated by the fuel cell. A connector 705 allows the tether to be electrically and detachably connected to an electrical adaptor 710 included in the package. Typically, a length of tether 702 determines the tether distance, but adding an extension cord (or the like) to either end may lengthen the tether distance. The tethered fuel cell package may resemble an AC adapter used for many conventional laptop computers, where the tethered package provides electrical energy from stored hydrogen or a fuel source.

Since the fuel cell package is portable, tethering the package provides a portable form of electrical power that may be plugged into one or multiple portable electronics devices. An output end 704 of the tether includes a connector 705 that electrically and detachably couples to an electronics device, while a fuel cell end 706 electrically and detachably couples to the fuel cell package (or is permanently attached thereto). Connector 705 may include any suitable electronics interface. For example, connector 705 may include a DC adapter interface, such as any of those commercially available from a wide array of vendors.

Tethered fuel cell package 700 then provides a portable source of electrical power suitable to detachably power one or more devices. For example, consumer electronics devices such as laptop computers and radios may benefit from a tethered adapter of the present invention. Tethered fuel cell package 700 may power multiple models of the same type, such as multiple computer laptops of the same model.

Tethered fuel cell package 700 may also provide varying electrical output to power different devices. Referring to FIG. 7B, package 700 includes an electrical adaptor 710 that converts electrical energy output by fuel cell 20 to a different electrical level for output on tether 702. In one embodiment, adapter 710 provides multiple output electrical settings for package 700. For example, one setting may include 12V 3 A service while a second provides 5V 1 A service. A switch or other device on the outside of the package 700 may allow a user to change between the multiple electrical outputs. The connector may also be wired so that the control board knows as what output voltage it should be operated. Electrical adapter 710 then includes suitable electronics to service each output setting. In this case, adapter 710 provides DC/DC conversion as determined by design of fuel cell 20 and desired output using tether 702.

Adapter 710 may also provide AC/DC conversion. In this case, package 700 includes a second connector (not shown) that receives an AC connector or wire. The AC wire detachably couples to an AC power source, such as a wall socket. Adapter 710 then includes circuitry that converts AC power into DC output on tether 702. For example, the circuitry may convert 65 Watt AC input into 45 Watt DC output.

Fuel Cell

Figure 2A:
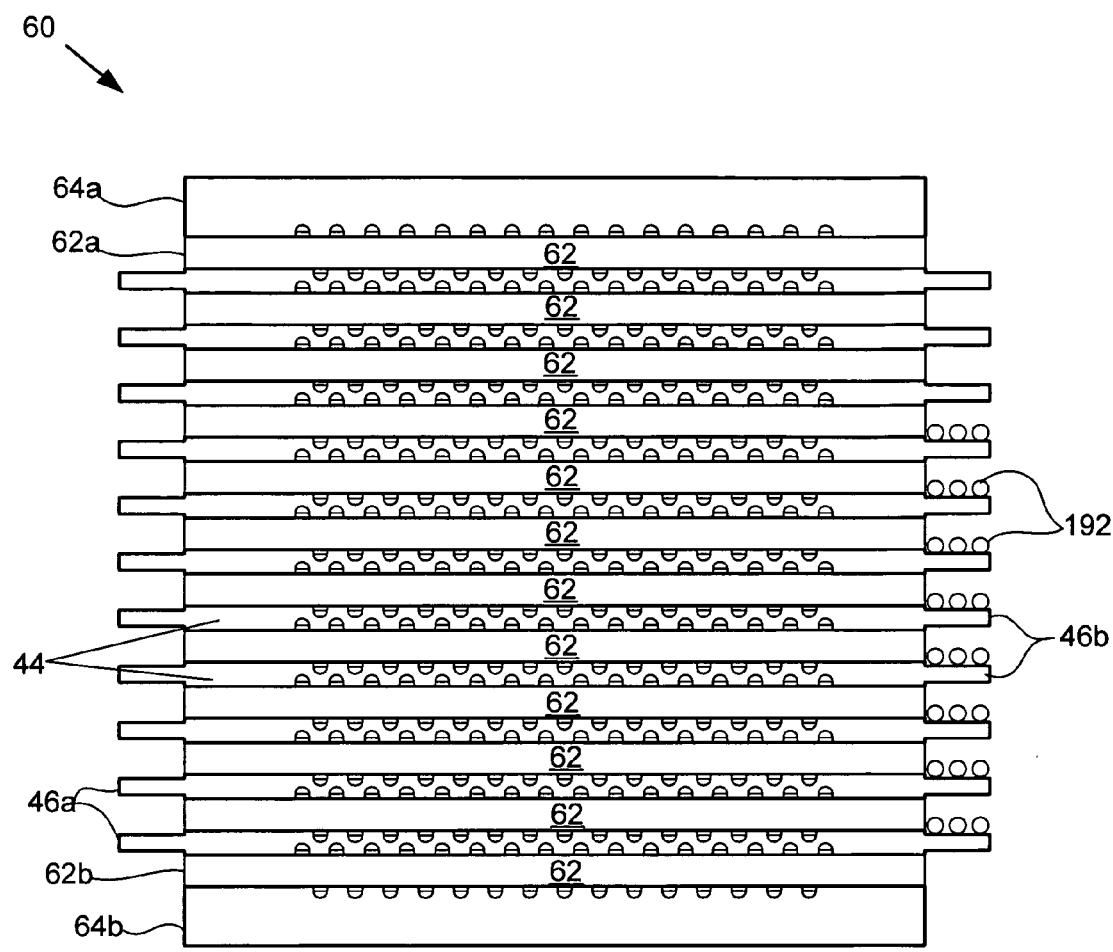
FIG. 2A illustrates a simplified cross sectional view of a fuel cell stack for use in the fuel cell of FIG. 1A in accordance with one embodiment of the present invention.
Figure 2B:
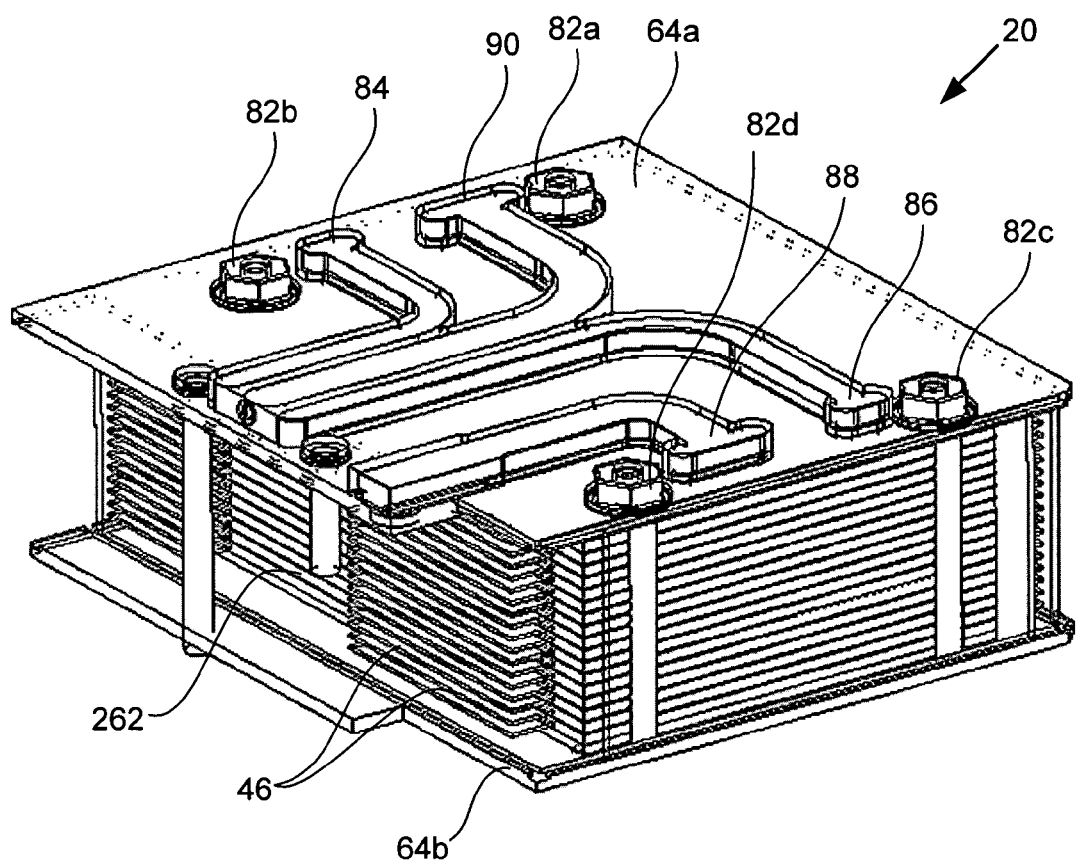
FIG. 2B illustrates an outer top perspective view of a fuel cell stack and fuel cell in accordance with another embodiment of the present invention.

FIG. 2A illustrates a cross sectional view of a fuel cell stack 60 for use in fuel cell 20 in accordance with one embodiment of the present invention. FIG. 2B illustrates an outer top perspective view of a fuel cell stack 60 and fuel cell 20 in accordance with another embodiment of the present invention.

Referring initially to FIG. 2A, fuel cell stack 60 includes a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field 72 on the face neighboring an MEA 62.

The bi-polar plates 44 in stack 60 also each include one or more heat transfer appendages 46. As shown, each bi-polar plate 44 includes a heat transfer appendage 46a on one side of the plate and a heat transfer appendage 46b on the opposite side. Heat transfer appendages 46 are discussed in further detail below.

As shown in FIG. 2A, stack 60 includes twelve membrane electrode assembly layers 62, eleven bi-polar plates 44 and two end plates 64 (FIG. 2B shows 18 plates 44 in the stack). The number of bi-polar plates 44 and MEA layers 62 in each set may vary with design of fuel cell stack 60. Stacking parallel layers in fuel cell stack 60 permits efficient use of space and increased power density for fuel cell 20 and a fuel cell package 10 including fuel cell 20. In one embodiment, each membrane electrode assembly 62 produces 0.7 V and the number of MEA layers 62 is selected to achieve a desired voltage. Alternatively, the number of MEA layers 62 and bi-polar plates 44 may be determined by the allowable thickness of package 10. A fuel cell stack 60 having from one MEA 62 to several hundred MEAs 62 is suitable for many applications. A stack 60 having from about three MEAs 62 to about twenty MEAs 62 is also suitable for numerous applications. Fuel cell 20 size and layout may also be tailored and configured to output a given power.

Referring to FIG. 2B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. End plates 64 may include steel or another suitably stiff material. Bolts 82a-d connect and secure top and bottom end plates 64a and 64b together.

Fuel cell 20 includes two anode manifolds (84 and 86). Each manifold delivers a product or reactant gas to or from the fuel cell stack 60. More specifically, each manifold delivers a gas between a vertical manifold created by stacking bi-polar plates 44 (FIG. 2D) and plumbing external to fuel cell 20. Inlet hydrogen manifold 84 is disposed on top end plate 64a, couples with an inlet conduit to receive hydrogen gas (such as 204a in FIG. 5A), and opens to an inlet hydrogen manifold 102 (FIG. 2D) that is configured to deliver inlet hydrogen gas to a channel field 72 on each bi-polar plate 44 in stack 60. Outlet manifold 86 receives outlet gases from an anode exhaust manifold 104 (FIG. 2D) that is configured to collect waste products from the anode channel fields 72 of each bi-polar plate 44. Outlet manifold 86 may provide the exhaust gases to the ambient space about the fuel cell. In another embodiment, manifold 86 provides the anode exhaust to line 38, which transports the unused hydrogen back to the fuel processor during start-up.

Fuel cell 20 includes two cathode manifolds: an inlet cathode manifold or inlet oxygen manifold 88, and an outlet cathode manifold or outlet water/vapor manifold 90. Inlet oxygen manifold 88 is disposed on top end plate 64a, couples with an inlet conduit (conduit 31, which draws air from the ambient room) to receive ambient air, and opens to an oxygen manifold 106 (FIG. 2D) that is configured to deliver inlet oxygen and ambient air to a channel field 72 on each bi-polar plate 44 in stack 60. Outlet water/vapor manifold 90 receives outlet gases from a cathode exhaust manifold 108 (FIG. 2D) that is configured to collect water (typically as a vapor) from the cathode channel fields 72 on each bi-polar plate 44.

As shown in FIG. 2B, manifolds 84, 86, 88 and 90 include molded channels that each travel along a top surface of end plate 64a from their interface from outside the fuel cell to a manifold in the stack. Each manifold or channel acts as a gaseous communication line for fuel cell 20 and may comprise a molded channel in plate 64 or a housing of fuel cell 20. Other arrangements to communicate gases to and from stack 60 are contemplated, such as those that do not share common manifolding in a single plate or structure.

FIG. 2C illustrates an ion conductive membrane fuel cell (PEMFC) architecture 120 for use in fuel cell 20 in accordance with one embodiment of the present invention. As shown, PEMFC architecture 120 comprises two bi-polar plates 44 and a membrane electrode assembly layer (or MEA)

62 sandwiched between the two bi-polar plates 44. The MEA 62 electrochemically converts hydrogen and oxygen to water and generates electrical energy and heat in the process. Membrane electrode assembly 62 includes an anode gas diffusion layer 122, a cathode gas diffusion layer 124, a hydrogen catalyst 126, ion conductive membrane 128, anode electrode 130, cathode electrode 132, and oxygen catalyst 134.

Pressurized hydrogen gas ($H_2$) enters fuel cell 20 via a hydrogen port, proceeds through inlet hydrogen manifold 102 and through hydrogen channels 74 of a hydrogen channel field 72a disposed on the anode face 75 of bi-polar plate 44a. The hydrogen channels 74 open to anode gas diffusion layer 122, which is disposed between the anode face 75 of bi-polar plate 44a and ion conductive membrane 128. The pressure forces hydrogen gas into the hydrogen-permeable anode gas diffusion layer 122 and across the hydrogen catalyst 126, which is disposed in the anode gas diffusion layer 122. When an $H_2$ molecule contacts hydrogen catalyst 126, it splits into two H+ ions (protons) and two electrons (e−). The protons move through the ion conductive membrane 128 to combine with oxygen in cathode gas diffusion layer 124. The electrons conduct through the anode electrode 130, where they build potential for use in an external circuit (e.g., a power supply of a laptop computer) After external use, the electrons flow to the cathode electrode 132 of PEMFC architecture 120.

Hydrogen catalyst 126 breaks hydrogen into protons and electrons. Suitable catalysts 126 include platinum, ruthenium, and platinum black or platinum carbon, and/or platinum on carbon nanotubes, for example. Anode gas diffusion layer 122 comprises any material that allows the diffusion of hydrogen therethrough and is capable of holding the hydrogen catalyst 126 to allow interaction between the catalyst and hydrogen molecules. One such suitable layer comprises a woven or non-woven carbon paper. Other suitable gas diffusion layer 122 materials may comprise a silicon carbide matrix and a mixture of a woven or non-woven carbon paper and Teflon.

On the cathode side of PEMFC architecture 120, pressurized air carrying oxygen gas ($O_2$) enters fuel cell 20 via oxygen port 88, proceeds through inlet oxygen manifold 106, and through oxygen channels 76 of an oxygen channel field 72b disposed on the cathode face 77 of bi-polar plate 44b. The oxygen channels 76 open to cathode gas diffusion layer 124, which is disposed between the cathode face 77 of bi-polar plate 44b and ion conductive membrane 128. The pressure forces oxygen into cathode gas diffusion layer 124 and across the oxygen catalyst 134 disposed in the cathode gas diffusion layer 124. When an $O_2$ molecule contacts oxygen catalyst 134, it splits into two oxygen atoms. Two H+ ions that have traveled through the ion selective ion conductive membrane 128 and an oxygen atom combine with two electrons returning from the external circuit to form a water molecule ($H_2O$). Cathode channels 76 exhaust the water, which usually forms as a vapor. This reaction in a single MEA layer 62 produces about 0.7 volts.

Cathode gas diffusion layer 124 comprises a material that permits diffusion of oxygen and hydrogen protons therethrough and is capable of holding the oxygen catalyst 134 to allow interaction between the catalyst 134 with oxygen and hydrogen. Suitable gas diffusion layers 124 may comprise carbon paper or cloth, for example. Other suitable gas diffusion layer 124 materials may comprise a silicon carbide matrix and a mixture of a woven or non-woven carbon paper and Teflon. Oxygen catalyst 134 facilitates the reaction of oxygen and hydrogen to form water. One common catalyst 134 comprises platinum. Many designs employ a rough and porous catalyst 134 to increase surface area of catalyst 134 exposed to the hydrogen or oxygen. For example, the platinum may reside as a powder very thinly coated onto a carbon paper or cloth cathode gas diffusion layer 124.

Ion conductive membrane 128 electrically isolates the anode from the cathode by blocking electrons from passing through membrane 128. Thus, membrane 128 prevents the passage of electrons between gas diffusion layer 122 and gas diffusion layer 124. Ion conductive membrane 128 also selectively conducts positively charged ions, e.g., hydrogen protons from gas diffusion layer 122 to gas diffusion layer 124. For fuel cell 20, protons move through membrane 128 and electrons are conducted away to an electrical load or battery. In one embodiment, ion conductive membrane 128 comprises an electrolyte. One electrolyte suitable for use with fuel cell 20 is Celtec 1000 from PEMEAS USA AG of Murray Hill, N.J. (www.pemeas.com). Fuel cells 20 including this electrolyte are generally more carbon monoxide tolerant and may not require humidification. Ion conductive membrane 128 may also employ a phosphoric acid matrix that includes a porous separator impregnated with phosphoric acid. Alternative ion conductive membranes 128 suitable for use with fuel cell 20 are widely available from companies such as United technologies, DuPont, 3M, and other manufacturers known to those of skill in the art. For example, WL Gore Associates of Elkton, Md. produces the primea Series 58, which is a low temperature MEA suitable for use with the present invention.

In one embodiment, fuel cell 20 requires no external humidifier or heat exchanger and the stack 60 only needs hydrogen and air to produce electrical power. Alternatively, fuel cell 20 may employ humidification of the cathode to fuel cell 20 improve performance. For some fuel cell stack 60 designs, humidifying the cathode increases the power and operating life of fuel cell 20.

Figure 2D:
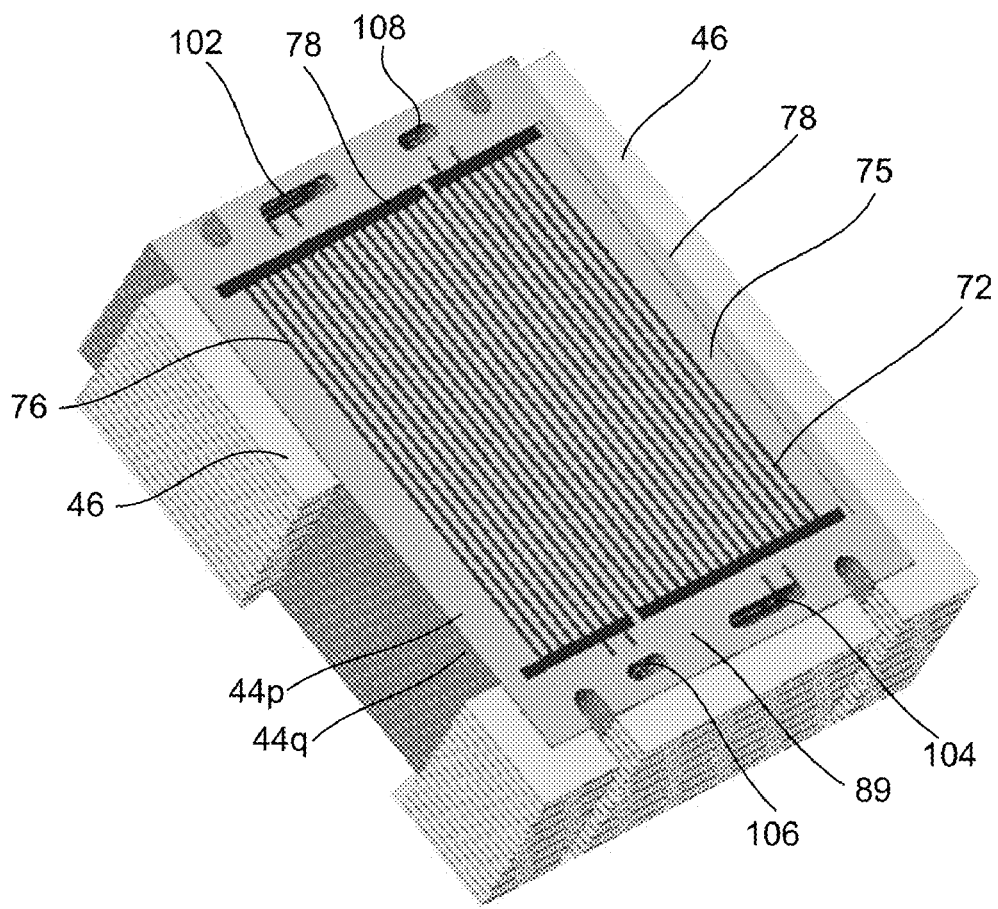
FIG. 2D illustrates a top perspective view of bi-polar plates in accordance with one embodiment of the present invention.

FIG. 2D illustrates a top perspective view of a stack of bi-polar plates (with the top two plates labeled 44p and 44q) in accordance with one embodiment of the present invention. Bi-polar plate 44 is a single plate 44 with first channel fields 72 disposed on opposite faces 75 of the plate 44.

Functionally, bi-polar plate 44 a) delivers and distributes reactant gases to the gas diffusion layers 122 and 124 and their respective catalysts, b) maintains separation of the reactant gasses from one another between MEA layers 62 in stack 60, c) exhausts electrochemical reaction byproducts from MEA layers 62, d) facilitates heat transfer to and/or from MEA layers 62 and fuel cell stack 60, and e) includes gas intake and gas exhaust manifolds for gas delivery to other bi-polar plates 44 in the fuel stack 60.

Structurally, bi-polar plate 44 has a relatively flat profile and includes opposing top and bottom faces (only top face 75 is shown) and a number of sides 78. Faces 75 are substantially planar with the exception of channels 76 formed as troughs into substrate 89. Sides 78 comprise portions of bi-polar plate 44 proximate to edges of bi-polar plate 44 between the two faces 75. As shown, bi-polar plate 44 is roughly quadrilateral with features for the intake manifolds, exhaust manifolds and heat transfer appendage 46 that provide outer deviation from a quadrilateral shape.

The manifold on each plate 44 is configured to deliver a gas to a channel field on a face of the plate 44 or receive a gas from the channel field 72. The manifolds for bi-polar plate 44 include apertures or holes in substrate 89 that, when combined with manifolds of other plates 44 in a stack 60, form an inter-plate 44 gaseous communication manifold (such as 102, 104, 106 and 108). Thus, when plates 44 are stacked and their manifolds substantially align, the manifolds permit gaseous delivery to and from each plate 44.

Bi-polar plate 44 includes a channel field 72 or "flow field" on each face of plate 44. Each channel field 72 includes one or more channels 76 formed into the substrate 89 of plate 44 such that the channel rests below the surface of plate 44. Each channel field 72 distributes one or more reactant gasses to an active area for the fuel cell stack 60. Bi-polar plate 44 includes a first channel field 72a on the anode face 75a of bi-polar plate 44 that distributes hydrogen to an anode (FIG. 2C), while a second channel field on opposite cathode face 75b distributes oxygen to a cathode. Specifically, channel field 72a includes multiple channels 74 that permit hydrogen flow to anode gas diffusion layer 122, while channel field 72b includes multiple channels 76 that permit oxygen and air flow to cathode gas diffusion layer 124. For fuel cell stack 60, each channel field 72 is configured to receive a reactant gas from an intake manifold 102 or 106 and configured to distribute the reactant gas to a gas diffusion layer 122 or 124. Each channel field 72 also collects reaction byproducts for exhaust from fuel cell 20. When bi-polar plates 44 are stacked together in fuel cell 60, adjacent plates 44 sandwich an MEA layer 62 such that the anode face from one bi-polar plate 44 neighbors a cathode face of an adjacent bi-polar plate 44 on an opposite side of the MEA layer 62.

Bi-polar plate 44 may include one or more heat transfer appendages 46. Each heat transfer appendage 46 permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62, for example. Heat transfer appendage 46 is laterally arranged outside channel field 72. In one embodiment, appendage 46 is disposed on an external portion of bi-polar plate 44. External portions of bi-polar plate 44 include any portions of plate 44 proximate to a side or edge of the substrate included in plate 44. External portions of bi-polar plate 44 typically do not include a channel field 72. For the embodiment shown, heat transfer appendage 46 substantially spans a side of plate 44 that does not include intake and output manifolds 102-108. For the embodiment shown in FIG. 2A, plate 44 includes two heat transfer appendages 46 that substantially span both sides of plate 44 that do not include a gas manifold.

Peripherally disposing heat transfer appendage 46 allows heat transfer between inner portions of plate 44 and the externally disposed appendage 46 via the plate substrate 89. Conductive thermal communication refers to heat transfer between bodies that are in contact or that are integrally formed. Thus, lateral conduction of heat between external portions of plate 44 (where the heat transfer appendage 46 attaches) and central portions of bi-polar plate 44 occurs via conductive thermal communication through substrate 89. In one embodiment, heat transfer appendage 46 is integral with substrate material 89 in plate 44. Integral in this sense refers to material continuity between appendage 46 and plate 44. An integrally formed appendage 46 may be formed with plate 44 in a single molding, stamping, machining or MEMs process of a single metal sheet, for example. Integrally forming appendage 46 and plate 44 permits conductive thermal communication and heat transfer between inner portions of plate 44 and the heat transfer appendage 46 via substrate 89. In another embodiment, appendage 46 comprises a material other than that used in substrate 89 that is attached onto plate 44 and conductive thermal communication and heat transfer occurs at the junction of attachment between the two attached materials.

Heat may travel to or form the heat transfer appendage 46. In other words, appendage 46 may be employed as a heat sink or source. Thus, heat transfer appendage 46 may be used as a heat sink to cool internal portions of bi-polar plate 44 or an MEA 62. Fuel cell 20 employs a cooling medium to remove heat from appendage 46. Alternatively, heat transfer appendage 46 may be employed as a heat source to provide heat to internal portions of bi-polar plate 44 or an MEA 62. In this case, a catalyst may be disposed on appendage 46 to generate heat in response to the presence of a heating medium.

For cooling, heat transfer appendage 46 permits integral conductive heat transfer from inner portions of plate 44 to the externally disposed appendage 46. During hydrogen consumption and electrical energy production, the electrochemical reaction generates heat in each MEA 62. Since internal portions of bi-polar plate 44 are in contact with the MEA 62, a heat transfer appendage 46 on a bi-polar plate 44 thus cools an MEA 62 adjacent to the plate via a) conductive heat transfer from MEA 62 to bi-polar plate 44 and b) lateral thermal communication and conductive heat transfer from central portions of the bi-polar plate 44 in contact with the MEA 62 to the external portions of plate 44 that include appendage 46. In this case, heat transfer appendage 46 sinks heat from substrate 89 between a first channel field 72 on one face 75 of plate 44 and a second channel field 72 on the opposite face of plate 44 to heat transfer appendage 46 in a direction parallel to a face 75 of plate 44. When a fuel cell stack 60 includes multiple MEA layers 62, lateral thermal communication through each bi-polar plate 44 in this manner provides interlayer cooling of multiple MEA Layers 62 in stack 60—including those layers in central portions of stack 60.

Fuel cell 20 may employ a cooling medium that passes over heat transfer appendage 46. The cooling medium receives heat from appendage 46 and removes the heat from fuel cell 20. Heat generated internal to stack 60 thus conducts through bi-polar plate 44, to appendage 46, and heats the cooling medium via convective heat transfer between the appendage 46 and cooling medium. Air is suitable for use as the cooling medium.

Heat transfer appendage 46 may be configured with a thickness that is less than the thickness between opposite faces 75 of plate 44. The reduced thickness of appendages 46 on adjacent bi-polar plates 44 in the fuel cell stack 60 forms a channel between adjacent appendages. Multiple adjacent bi-polar plates 44 and appendages 46 in stack form numerous channels. Each channel permits a cooling medium or heating medium to pass therethrough and across heat transfer appendages 46. In one embodiment, fuel cell stack 60 includes a mechanical housing that encloses and protects stack 60. Walls of the housing also provide additional ducting for the cooling or heating medium by forming ducts between adjacent appendages 46 and the walls.

The cooling medium may be a gas or liquid. Heat transfer advantages gained by high conductance bi-polar plates 44 allow air to be used as a cooling medium to cool heat transfer appendages 46 and stack 60. For example, a dc-fan 37 may be attached to an external surface of the mechanical housing. The fan 37 moves air through a hole in the mechanical housing, through the channels between appendages to cool heat transfer appendages 46 and fuel cell stack 60, and out an exhaust hole or port in the mechanical housing. Fuel cell system 10 may then include active thermal controls based on temperature sensed feedback. Increasing or decreasing coolant fan speed regulates the amount of heat removal from stack 60 and the operating temperature for stack 60. In one embodiment of an air-cooled stack 60, the coolant fan speed increases or decreases as a function of the actual cathode exit temperature, relative to a desired temperature set-point.

For heating, heat transfer appendage 46 allows integral heat transfer from the externally disposed appendage 46 to inner portions of plate 44 and any components and portions of fuel cell 20 in thermal communication with inner portions of plate 44. A heating medium passed over the heat transfer appendage 46 provides heat to the appendage. Heat convected onto the appendage 46 then conducts through the substrate 89 and into internal portions of plate 44 and stack 60, such as portions of MEA 62 and its constituent components.

In one embodiment, the heating medium comprises a heated gas having a temperature greater than that of appendage 46. Exhaust gases from heater 30 or reformer 32 of fuel processor 15 may each include elevated temperatures that are suitable for heating one or more appendages 46.

In another embodiment, fuel cell comprises a catalyst 192 (FIG. 2A) disposed in contact with, or in proximity to, one or more heat transfer appendages 46. The catalyst 192 generates heat when the heating medium passes over it. The heating medium in this case may comprise any gas or fluid that reacts with catalyst 192 to generate heat. Typically, catalyst 192 and the heating medium employ an exothermic chemical reaction to generate the heat. Heat transfer appendage 46 and plate 44 then transfer heat into the fuel cell stack 60, e.g. to heat internal MEA layers 62. For example, catalyst 192 may comprise platinum and the heating medium includes the hydrocarbon fuel source 17. The fuel source 17 may be heated to a gaseous state before it enters fuel cell 20. This allows gaseous transportation of the heating medium and gaseous interaction between the fuel source 17 and catalyst 192 to generate heat. Similar to the cooling medium described above, a fan disposed on one of the walls then moves the gaseous heating medium within fuel cell 20.

In a specific embodiment, the hydrocarbon fuel source 17 used to react with catalyst 192 comes from a reformer exhaust (see FIG. 1C) or heater exhaust in fuel processor 15. This advantageously pre-heats the fuel source 17 before receipt within fuel cell 20 and also efficiently uses or burns any fuel remaining in the reformer or heater exhaust after processing by fuel processor 15. Alternatively, fuel cell 20 may include a separate hydrocarbon fuel source 17 feed that directly supplies hydrocarbon fuel source 17 to fuel cell 20 for heating and reaction with catalyst 192. In this case, catalyst 192 may comprise platinum. Other suitable catalysts 192 include palladium, a platinum/palladium mix, iron, ruthenium, and combinations thereof. Each of these will react with a hydrocarbon fuel source 17 to generate heat. Other suitable heating mediums include hydrogen or any heated gases emitted from fuel processor 15, for example.

When hydrogen is used as the heating medium, catalyst 192 comprises a material that generates heat in the presence of hydrogen, such as palladium or platinum. As will be described in further detail below, the hydrogen may include hydrogen supplied from the reformer 32 in fuel processor 15 as exhaust.

As shown in FIG. 2A, catalyst 192 is arranged on, and in contact with, each heat transfer appendage 46. In this case, the heating medium passes over each appendage 46 and reacts with catalyst 192. This generates heat, which is absorbed via conductive thermal communication by the cooler appendage 46. Wash coating may be employed to dispose catalyst 192 on each appendage 46. A ceramic support may also be used to bond catalyst 192 on an appendage 46.

For catalyst-based heating, heat then a) transfers from catalyst 192 to appendage 46, b) moves laterally though bi-polar plate 44 via conductive heat transfer from lateral portions of the plate that include heat transfer appendage 46 to central portions of bi-polar plate 44 in contact with the MEA layers 62, and c) conducts from bi-polar plate 44 to MEA layer 62. When a fuel cell stack 60 includes multiple MEA layers 62, lateral heating through each bi-polar plate 44 provides inter-layer heating of multiple MEA layers 62 in stack 60, which expedites fuel cell 20 warm up.

Bi-polar plates 44 of FIG. 2A include heat transfer appendages 46 on each side. In this case, one set of heat transfer appendages 46a is used for cooling while the other set of heat transfer appendages 46b is used for heating. Bi-polar plates 44 illustrated in FIG. 2D show plates 44 with four heat transfer appendages 46 disposed on three sides of stack 60. Appendage 46 arrangements can be otherwise varied to affect and improve heat dissipation and thermal management of fuel cell stack 60 according to other specific designs. For example, appendages 46 need not span a side of plate 44 as shown and may be tailored based on how the heating fluid is channeled through the housing.

Although the present invention provides a bi-polar plate 44 having channel fields 72 that distribute hydrogen and oxygen on opposing sides of a single plate 44, many embodiments described herein are suitable for use with conventional bi-polar plate assemblies that employ two separate plates for distribution of hydrogen and oxygen.

While the present invention has mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, channel fields 72 in the bi-polar plates 44 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst 126, cathode catalyst 128, anode fuel and oxidant according to a specific SOFC, PAFC or MCFC design.

Fuel Processor

Figure 3A:
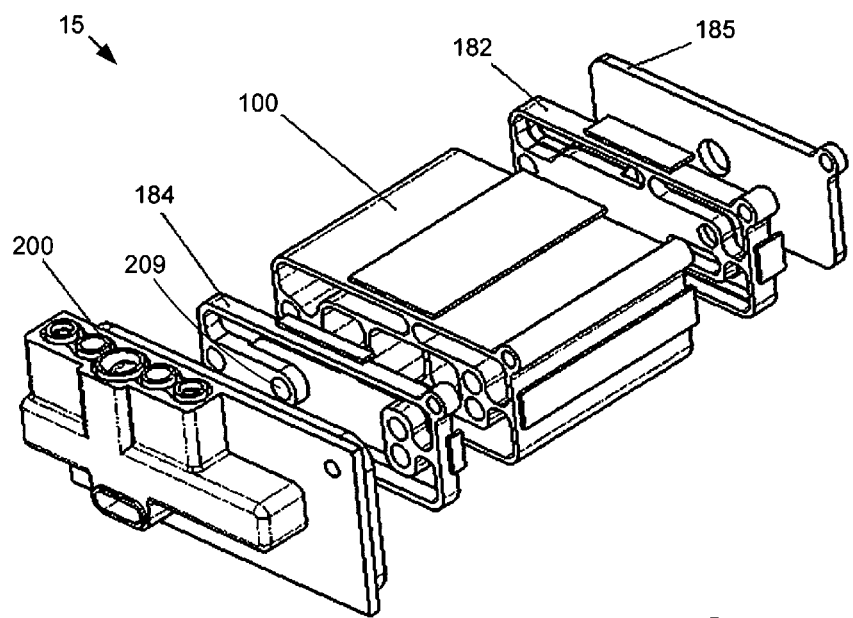
FIG. 3A illustrates an outer top perspective view of a fuel processor used in the fuel cell system of FIG. 1A.
Figure 3B:
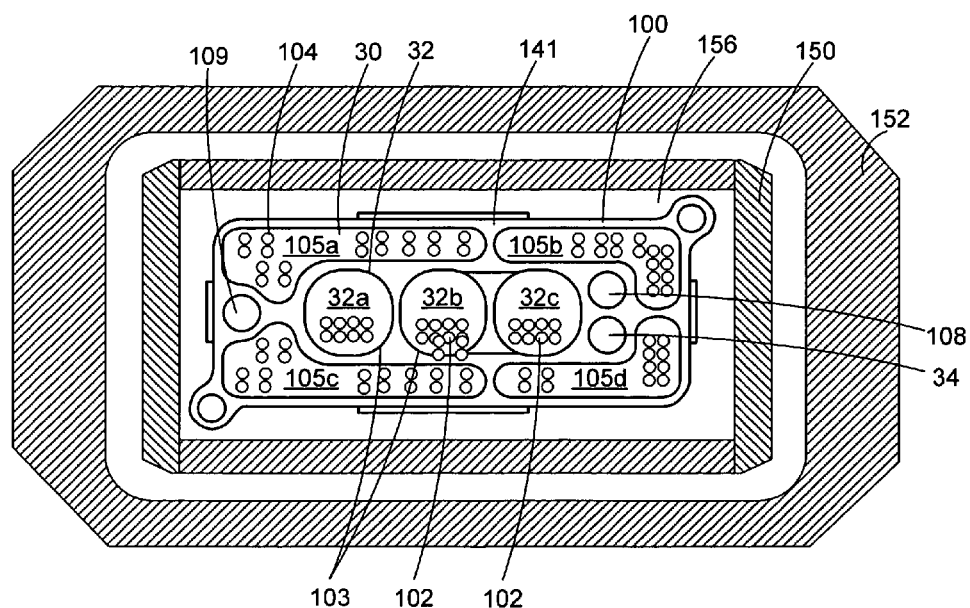
FIG. 3B illustrates a cross-sectional front view of a main component in the fuel processor used in the fuel cell system of FIG. 1A taken through a mid-plane of fuel processor.

FIG. 3A illustrates a perspective view of components included in a fuel processor 15 in accordance with one embodiment of the present invention. FIG. 3B illustrates a cross-sectional front view of monolithic structure 100. Fuel processor 15 reforms methanol to produce hydrogen. Fuel processor 15 comprises monolithic structure 100, end plates 182 and 184, end plate 185, reformer 32, heater 30, boiler 34, boiler 108, dewar 150 and housing 152. Although the present invention will now be described with respect to methanol consumption for hydrogen production, it is understood that fuel processors of the present invention may consume another fuel source, as one of skill in the art will appreciate.

As the term is used herein, 'monolithic' refers to a single and integrated structure that includes at least portions multiple components used in fuel processor 15. As shown in FIG. 3B, monolithic structure 100 includes reformer 32, burner 30, boiler 34 and boiler 108. Monolithic structure 100 also includes associated plumbing inlets and outlets for reformer 32, burner 30 and boiler 34 disposed on end plates 182 and 184 and interconnect 200. Monolithic structure 100 comprises a common material 141 that constitutes the structure. The monolithic structure 100 and common material 141 simplify manufacture of fuel processor 15. For example, using a metal for common material 141 allows monolithic structure 100 to be formed by extrusion. In a specific embodiment, monolithic structure 100 is consistent in cross sectional dimensions between end plates 182 and 184 and solely comprises copper formed in a single extrusion.

Referring to FIG. 3B, housing 152 provides mechanical protection for internal components of fuel processor 15 such as burner 30 and reformer 32. Housing 152 also provides separation from the environment external to processor 15 and includes inlet and outlet ports for gaseous and liquid communication in and out of fuel processor 15. Housing 152 includes a set of housing walls that at least partially contain a dewar 150 and provide external mechanical protection for components in fuel processor 15. The walls may comprises a suitably stiff material such as a metal or a rigid polymer, for example. Dewar 150 improves thermal heat management for fuel processor 15 by a) allowing incoming air to be pre-heated before entering burner 30, b) dissipating heat generated by burner 32 into the incoming air before the heat reaches the outside of housing 152.

Boiler 34 heats methanol before reformer 32 receives the methanol. Boiler 34 receives methanol via a fuel source inlet 81 on interconnect 200 (FIG. 5A), which couples to a methanol supply line 27 (FIG. 1C). Since methanol reforming and hydrogen production via a catalyst 102 in reformer 32 often requires elevated methanol temperatures, fuel processor 15 pre-heats the methanol before receipt by reformer 32 via boiler 34. Boiler 34 is disposed in proximity to burner 30 to receive heat generated in burner 30. The heat transfers via conduction through monolithic structure from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Walls in monolithic structure 100 and end walls on end plates 182 and 184 define dimensions for a reformer chamber 103. In one embodiment, end plate 182 and/or end plate 184 includes a channel that routes heated methanol exhausted from boiler 34 into reformer 32.

In one embodiment, a reformer includes a multi-pass arrangement. Reformer 32 includes three multi-pass portions that process methanol in series: chamber section 32*a*, chamber section 32*b*, and chamber section 32*c*. A reformer chamber 103 then includes the volume of all three sections 32*a-c*. Each section traverses the length of monolithic structure 100; and opens to each other in series such that sections 32*a-c* form one continuous path for gaseous flow. More specifically, heated and gaseous methanol from boiler 34 a) enters reformer chamber section 32*a* at an inlet end of monolithic structure 100 and flows to the other end over catalyst 102 in section 32*a*, b) then flows into chamber section 32*b* at the second end of monolithic structure 100 and flows to the inlet end over catalyst 102 in section 32*b*, and c) flows into chamber section 32*c* at one end of monolithic structure 100 and flows to the other end over catalyst 102 in the chamber section 32*c*.

Reformer 32 includes a catalyst 102 that facilitates the production of hydrogen. Catalyst 102 reacts with methanol and produces hydrogen gas and carbon dioxide. In one embodiment, catalyst 102 comprises pellets packed to form a porous bed or otherwise suitably filled into the volume of reformer chamber 103. Pellet diameters ranging from about 50 microns to about 1.5 millimeters are suitable for many applications. Pellet diameters ranging from about 500 microns to about 1 millimeter are suitable for use with reformer 32. Pellet sizes may be varied relative to the cross sectional size of reformer sections 32*a-c*, e.g., as the reformer sections increase in size so does catalyst 102 pellet diameters. Pellet sizes and packing may also be varied to control the pressure drop that occurs through reformer chamber 103. In one embodiment, pressure drops from about 0.2 to about 2 psi gauge are suitable between the inlet and outlet of reformer chamber 103. One suitable catalyst 102 may include CuZn coated onto alumina pellets when methanol is used as a hydrocarbon fuel source 17. Other materials suitable for catalyst 102 include platinum, palladium, a platinum/palladium mix, nickel, and other precious metal catalysts for example. Catalyst 102 pellets are commercially available from a number of vendors known to those of skill in the art. Catalyst 102 may also comprise catalyst materials listed above coated onto a metal sponge or metal foam. A wash coat of the desired metal catalyst material onto the walls of reformer chamber 103 may also be used for reformer 32.

Reformer 32 is configured to output hydrogen and includes an outlet port 209 that communicates hydrogen formed in reformer 32 outside of fuel processor 15. Port 209 is disposed on a wall of end plate 184 and includes a hole that passes through the wall. Port 209 opens to hydrogen conduit 204*a* in interconnect 200, which then forms part of a hydrogen provision line 39 (FIG. 1C). Line 39 communicates the hydrogen to the anode of fuel cell 20 for electrical energy generation.

Hydrogen production in reformer 32 is slightly endothermic and draws heat from burner 30. Burner 30 generates heat and is configured to provide heat to reformer 32. As shown in FIG. 3B, burner 30 comprises four burner chambers 105*a-d* that surround reformer 32. In one embodiment, burner 30 uses electrical resistance and electrical energy to produce heat.

In the embodiment shown, burner 30 employs catalytic combustion to produce heat. As the term is used herein, a burner refers to a heater that uses a catalytic heating process to generate heat. A heater in a fuel processor of the present invention may alternatively employ electrical heating, for example. A catalyst 104 disposed in each burner chamber 105 helps a burner fuel passed through the chamber generate heat. Burner 30 includes an inlet that receives methanol 17 from boiler 108 via a channel in one of end plates 182 or 184. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof. The catalyst 104 is commercially available from a number of vendors known to those of skill in the art as small pellets. The pellets that may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam or wash coated onto the walls of burner chamber 105.

Some fuel sources generate additional heat in burner 30, or generate heat more efficiently, with elevated temperatures. Fuel processor 15 includes a boiler 108 that heats methanol before burner 30 receives the fuel source. In this case, boiler 108 receives the methanol via fuel source inlet 85. Boiler 108 is disposed in proximity to burner 30 to receive heat generated in burner 30. The heat transfers via conduction through monolithic structure from burner 30 to boiler 108 and via convection from boiler 108 walls to the methanol passing therethrough.

Air including oxygen enters fuel processor 15 via air inlet port 91. Burner 30 uses the oxygen for catalytic combustion of methanol. A burner 30 in fuel processor 15 generates heat and typically operates at an elevated temperature. In one embodiment, fuel processor 15 comprises a dewar 150 to improve thermal management for fuel processor 15. Dewar 150 at least partially thermally isolates components internal to housing 152—such as burner 30—and contains heat within fuel processor 15. Dewar 150 is configured such that air passing through dewar chamber 156 receives heat generated in burner 30. Dewar 150 offers thus two functions for fuel processor 15: a) it permits active cooling of components within fuel processor 15 before the heat reaches an outer portion of the fuel processor, and b) it pre-heats the air going to burner 30. Air first passes along the outside of dewar 150 before passing through apertures in the dewar and along the inside of dewar 150. This heats the air before receipt by air inlet port 93 of burner 30.

In one embodiment, package 10 runs anode exhaust from the fuel cell 20 back to fuel processor. As shown in FIG. 1C, line 38 routes unused hydrogen from fuel cell 20 burner inlet 109, which provides the anode exhaust to burner 30 (or to the regenerator 36 and then to burner inlet 109 and into burner 30). Burner 30 includes a thermal catalyst that reacts with the unused hydrogen to produce heat. Since hydrogen consumption within fuel cell 20 is often incomplete and the anode exhaust often includes unused hydrogen, re-routing the anode exhaust to burner 30 allows fuel cell system 10 to capitalize on unused hydrogen in fuel cell 20 and increase hydrogen usage and efficiency. Package 10 thus provides flexibility to use different fuels in a catalytic burner 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Burner inlet 109 traverses monolithic structure 100 and carries anode exhaust from fuel cell 20 before provision into burner 30. Disposing burner inlet 109 adjacent to a burner chamber 105 also heats the incoming anode exhaust, which reduces heat transferred to the anode exhaust in the burner chamber 105.

In another embodiment, package 10 runs a heating medium from fuel processor 15 to fuel cell 20 to provide heat to fuel cell 20. In this case, package 10 includes plumbing configured to transport the heating medium from fuel processor 15 to fuel cell 20. As the term is used herein, plumbing may comprise any tubing, piping and/or channeling that communicates a gas or liquid from one location to a second location. The plumbing may also comprise one or more valves, gates or other devices to facilitate and control flow. Plumbing between burner 30 and fuel cell 20 will be described in further detail below with respect to interconnect 200.

In a specific embodiment, line 35 transports heated gases to fan 37, which moves the heated gases within fuel cell 20 and across the fuel cell stack and heat transfer appendages (FIG. 1C). Alternatively, the plumbing may be configured to transport the heating medium from burner 30 to one or more heat transfer appendages. In this case, line 35 may continue through the fuel cell housing and open in the proximity of one or more heat transfer appendages. A hole in the fuel cell housing then allows line 35 to pass therethrough or connect to a port that communicates the gases to plumbing inside the fuel cell for delivery to the fuel cell stack and heat transfer appendage. For catalytic heat generation in fuel cell 20, the plumbing may also transport the heating medium to facilitate gaseous interaction with the catalyst, such as plumbing delivery to one or more bulkheads.

In one embodiment, the heating medium comprises heated gases exhausted from burner 30. A catalytic burner or electrical resistance burner operates at elevated temperatures. Cooling air exhausted from an electric burner or product gases exhausted from a catalytic burner are often greater than about 100 degrees Celsius when the gases leaves the fuel processor. For many catalytic burners, depending on the fuel source employed, the heating medium is commonly greater than about 200 degrees Celsius when the heating medium leaves the fuel processor. These heated gases are transported to the fuel cell for convective heat transfer in the fuel cell, such as passing the heated gases over one or more heat transfer appendages 46 for convective heat transfer from the warmer gases into the cooler heat transfer appendages.

In another embodiment, burner 30 is a catalytic burner and the heating medium comprises the fuel source. Catalytic combustion in burner 30 is often incomplete and the burner exhaust gases include unused and gaseous methanol. Fuel cell 20 then comprises a thermal catalyst that facilitates production of heat in the fuel cell in the presence of methanol. The fuel source is typically vaporized prior to reaching the burner to facilitate catalytic combustion. In this case, conduit 35 transports the gaseous and unused methanol to the thermal catalyst in fuel cell 20. Several suitable thermal catalyst arrangements for transferring heat into heat transfer appendages 46 are described below (FIG. 2A). Suitable methanol catalysts, such as platinum or palladium coated onto alumina pellets, are also described above with respect to catalyst 104 in burner 30.

In one embodiment, the heating medium is transported to the fuel cell during a start-up period before the fuel cell begins generating electrical energy, e.g., in response to a request for electrical energy. Heating a fuel cell in this manner allows fuel cell component operating temperatures to be reached sooner and expedites warm-up time needed when initially turning on fuel cell 20. In another embodiment, the heating medium is transported from the fuel processor to the fuel cell during a period of non-activity in which the fuel cell does not generate electrical energy and the component cools. Since many fuel cells require elevated temperatures for operation and the electrical energy generating process is exothermic, the fuel cell usually does not require external heating during electrical energy generation. However, when electrical energy generation ceases for an extended time and the component drops below a threshold operating temperature, the heating medium may then be transported from the fuel processor to regain the operating temperature and resume electrical energy generation. This permits operating temperatures in a fuel cell to be maintained when electrical energy is not being generated by the fuel cell.

Although the present invention will primarily be described with respect to the reformer and burner shown in FIGS. 3A and 3B, it is anticipated that a fuel cell package may include other fuel processor designs. Many architectures employ a planar reformer disposed on top or below to a planar burner. Micro-channel designs fabricated in silicon commonly employ such stacked planar architectures may be used. Other fuel processors may be used that process fuel sources other than methanol. Fuel sources other than methanol were listed above, and processors for these fuels are not detailed herein for sake of brevity. Further description of planar fuel processors suitable for use with the present invention are included in commonly owned co-pending patent application Ser. No. 10/877,044, which is incorporated by reference for all purposes.

Interconnect

One embodiment for combining a fuel cell and fuel processor in a common package employs a fuel cell system interconnect. The interconnect is disposed at least partially between the fuel cell and the fuel processor, and forms a structural and plumbing intermediary between the two.

Combining a fuel cell and a fuel processor in a common package introduces a number of potential obstacles, such as plumbing connectivity, space, and operating temperature differences. The interconnect described herein invention overcomes many of these obstacles to facilitate a fuel cell package with reduced size and form factor.

Figure 5A:
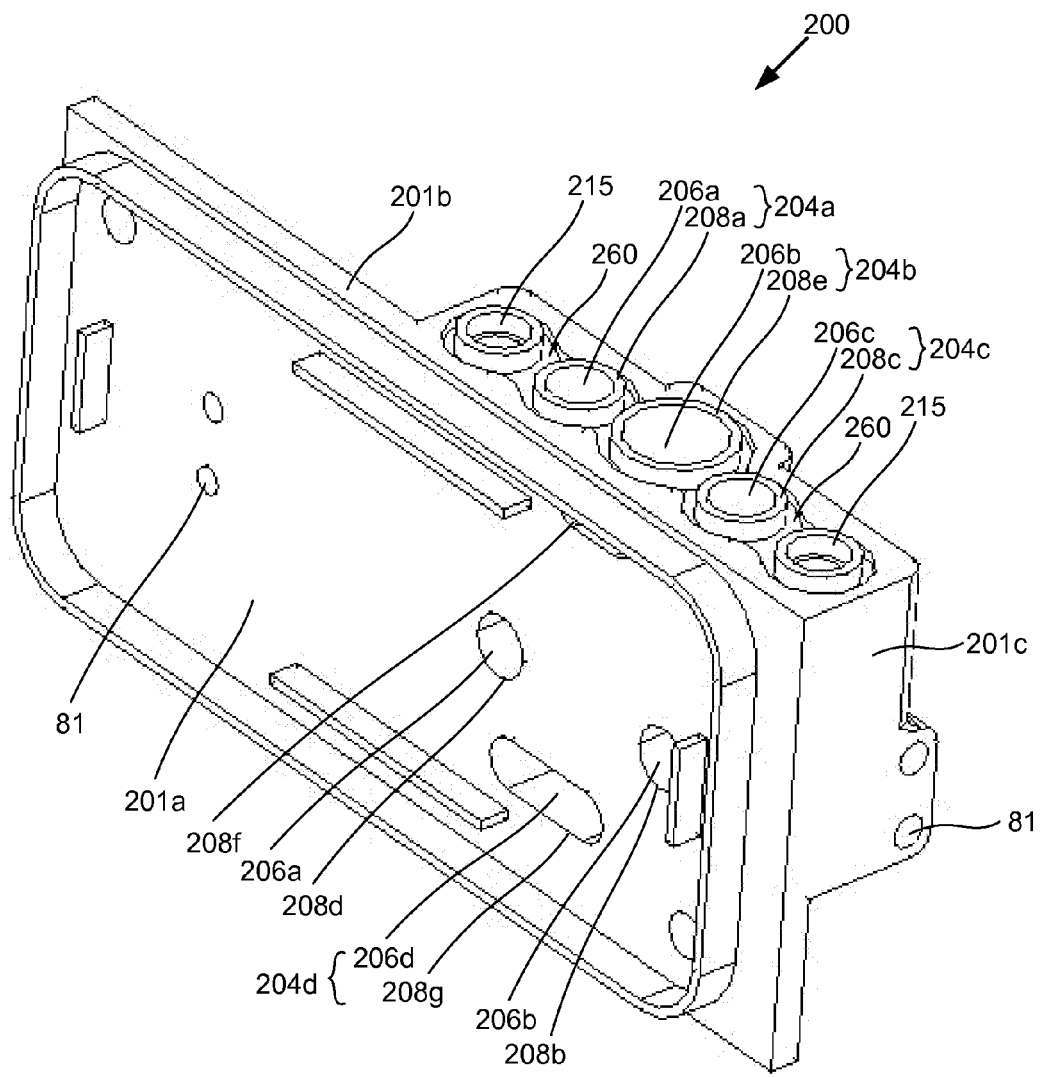
FIG. 5A illustrates a perspective view of an interconnect for use in a fuel cell package in accordance with one embodiment of the present invention.
Figure 5B:
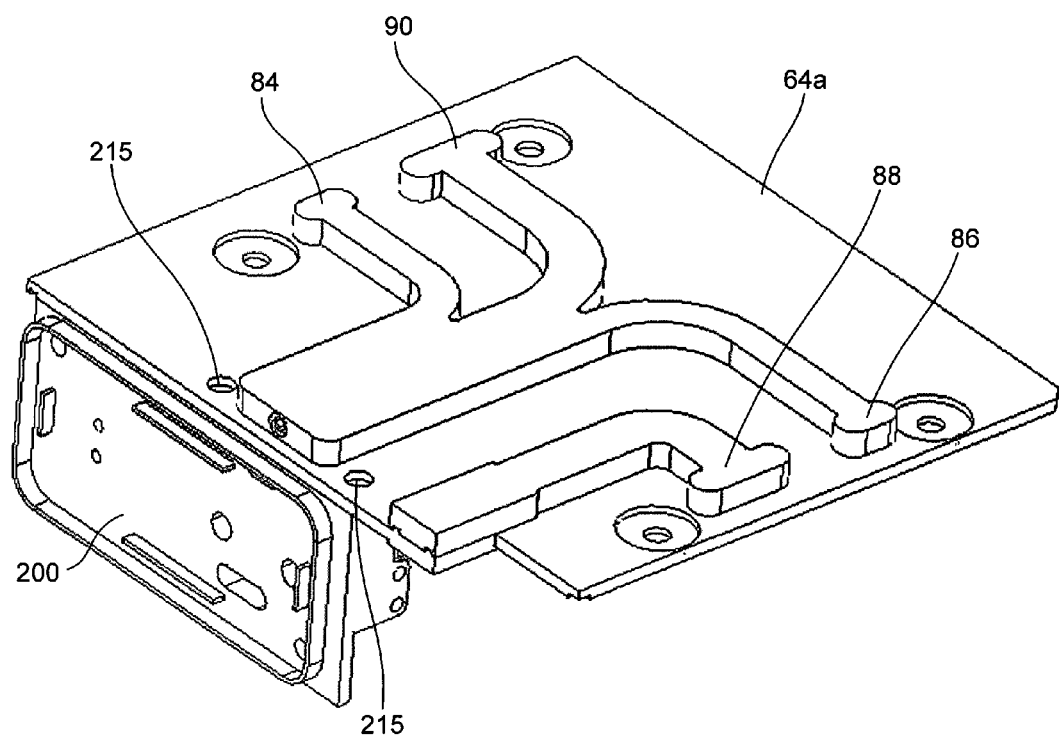
FIG. 5B shows the interconnect of FIG. 5A attached to a top plate of a fuel cell.
Figure 5C:
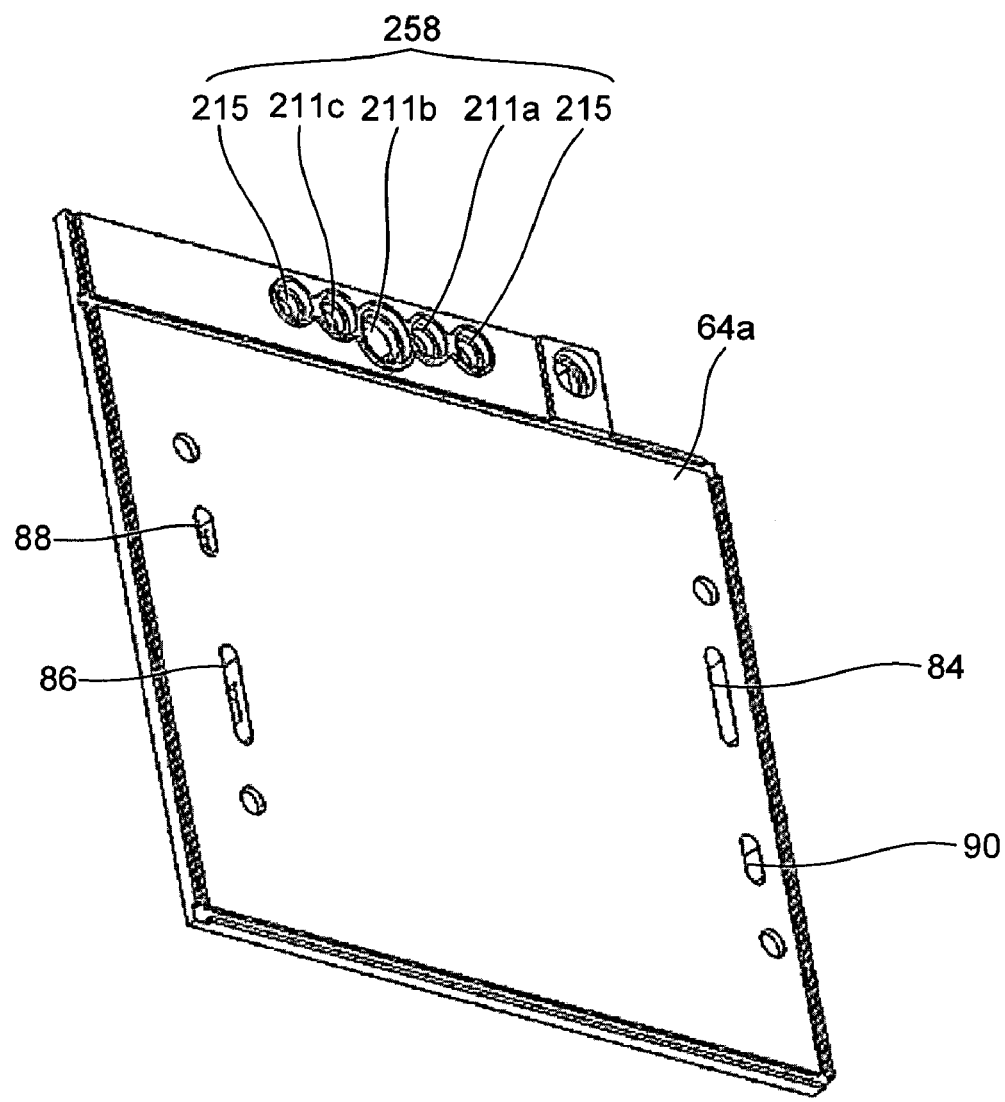
FIG. 5C illustrates the underside of a top plate that couples to the interconnect of FIG. 5A.
Figure 5D:
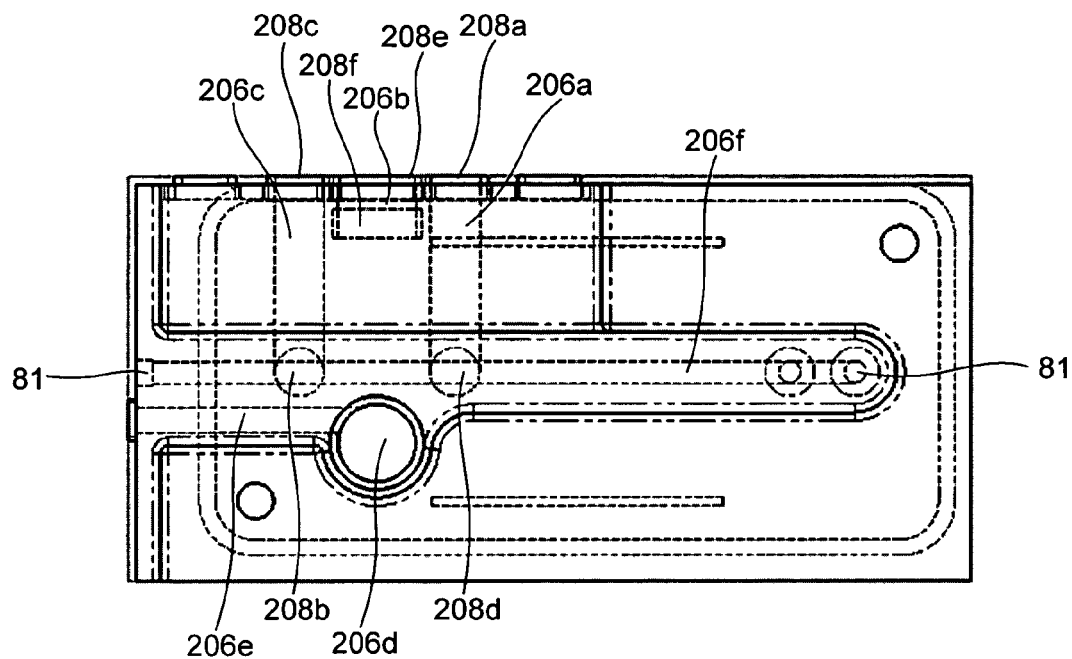
FIG. 5D shows a side view of the interconnect of FIG. 5A and exemplary dimensions of its internal plumbing.
Figure 5E:
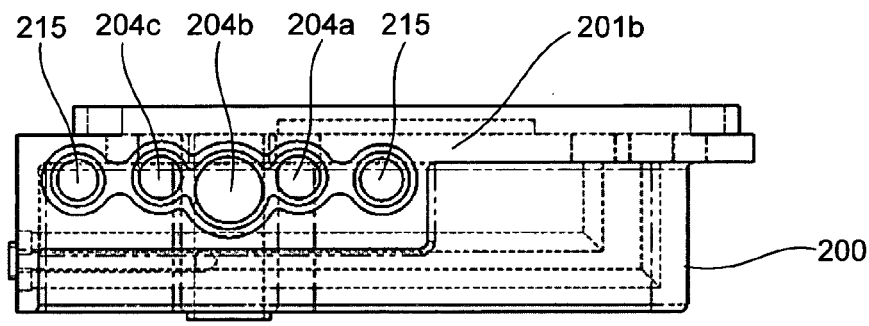
FIG. 5E illustrates a top view of the interconnect of FIG. 5A and an exemplary arrangement of ports on one surface that provides a unique coupling interface with the interconnect.

FIG. 5A illustrates a perspective view of an interconnect 200 for use in a fuel cell package in accordance with one embodiment of the present invention. FIG. 3A shows interconnect 200 positioned relative to fuel processor 15 when assembled in a package. FIG. 5B shows interconnect 200 coupled to the top plate 64a of fuel cell 20. FIG. 5C illustrates the underside of top plate 64a in accordance with a specific embodiment of the present invention. FIG. 5D illustrates plumbing internal to interconnect 200. FIG. 5E illustrates a top view of the interconnect 200 and an arrangement of ports 208 that uniquely identifies interconnect 200.

Referring initially to FIG. 5A, interconnect 200 includes a number of sides 201 and a suitably rigid material, such as a metal. Side 201a interfaces with fuel processor 15; top side 201b interfaces with fuel cell 20. Side 201c services inlet plumbing to the fuel processor. Each side 201 refers generally to an exterior face of interconnect 200, need not be entirely flat, and includes one or more surfaces. Indeed, each side 201 may include recessed or heightened features, as shown. Different sides and surface arrangements for interconnect 200 are possible and contemplated.

Interconnect 200 may include one or more materials. In one embodiment, interconnect 200 is constructed from a suitably rigid material that adds structural integrity to a fuel cell package and provides rigid connectivity between a fuel cell and fuel processor. Many metals are suitable for use with interconnect 200. In one embodiment, interconnect 200 includes a single piece of fabricated material. Metals and high temperature plastics are suitable for use in this case. In a specific embodiment, interconnect 200 is machined from a single block of steel or aluminum. The material used in interconnect 200 may or may not be thermally conductive, depending on thermal design of the fuel cell package.

Interconnect 200 includes plumbing for communicating any number of gases and liquids between a fuel cell and fuel processor. For the fuel cell system 10 of FIG. 1C, plumbing serviced by interconnect 200 includes 1) a hydrogen line 39 from the fuel processor to the fuel cell, 2) a line 38 returning unused hydrogen from the fuel cell back to the fuel processor, 3) an oxygen line 33 from the fuel cell to the fuel processor, and 4) a reformer or burner exhaust line 37 traveling from the fuel processor to the fuel cell. Other gas or liquid transfers between a fuel cell and fuel processor, in either direction, may be serviced by interconnect 200. In one embodiment, interconnect 200 internally incorporates all plumbing for gases and liquids it transfers to minimize exposed tubing and package size.

Interconnect 200 includes a set of conduits 204 for fluid and gas communication between fuel cell 20 and fuel processor 15. As the term is used herein, a conduit refers to a channel, tube, routing port, pipe, or the like that permits gaseous or fluid communication between two locations. For interconnect 200, each conduit 204 includes a channel 206 (FIGS. 5A and 5D) within the interconnect 200 and a port 208 (or aperture) on each end of channel 206. For example, one conduit 204a may include a port 208d that receives hydrogen from the fuel processor on one side 201a of interconnect 200 and communicates the hydrogen—through interconnect 200—and to a port 208a on side 201b to the fuel cell. Each port 208 facilitates connectivity with interconnect 200. When assembled, each port 208 interfaces with plumbing from a fuel cell or fuel processor, or plumbing intermediaries therebetween.

In one embodiment, both fuel cell 20 and fuel processor 15 include fixed plumbing to interface with interconnect 200. The plumbing communicates the liquid or gas between a port 208 on interconnect 200 and a functional portion of fuel cell 20 or fuel processor 15 (e.g., hydrogen fuel inlet to the fuel cell). FIG. 5C shows fixed plumbing channels 84, 86, 88 and 90 disposed on an inner surface of the top plate 64 of fuel cell 20. Channels 84, 86, 88 and 90 communicate gases between interconnect 200 and manifolds in the fuel cell stack 60. For example, a fixed channel 84 on top plate 64 communicates hydrogen from interconnect 200 to a hydrogen manifold in stack 60, which then delivers the hydrogen to gas distribution channels in each bi-polar plate.

Fuel cell 20 and fuel processor 15 also include connections or ports that mate with interconnect ports 208 to facilitate interface and product or reactant delivery. FIG. 5C illustrates mating ports 211 on a top plate 64 of fuel cell 20. FIG. 3A illustrates mating ports 209 on end plate 184 of fuel processor 15. A gasket may be disposed between end plate 184 and interconnect 200 to improve sealing. Similarly, a gasket may be disposed between top plate 64 and interconnect 200. Although the fuel processor 15 and fuel cell 20 are shown with separate plates that interface with interconnect 200, other arrangements for interfacing with interconnect 200 are suitable for use with the present invention. For example, although interconnect 200 interfaces with one side to fuel cell 20 and another side to fuel processor 15, the present invention is not limited to such simple geometric relationship. Alternatively, either the fuel cell 20 or fuel processor 15 interact with two or more sides of interconnect 200.

Referring now to the delivery of specific gases, interconnect 200 communicates hydrogen from fuel processor 15 to fuel cell 20. A hydrogen conduit 204a in interconnect 200 then forms part of a hydrogen provision line 39 (FIG. 1C). For fuel processor 15 and fuel cell 20, hydrogen conduit 204a receives hydrogen from a hydrogen channel 209 included in fuel processor 15 (FIG. 3A) and outputs the hydrogen to a hydrogen channel 74 included in fuel cell 20 (FIGS. 5B and 5C). Line 39 thus includes (in order of hydrogen delivery): reformer exit via channel 209 in fuel processor 15, conduit 204a in interconnect 200, and channel 74 in fuel cell 20. Hydrogen conduit 204a includes a channel 206a and two ports 208a and 208d (FIG. 5A). Channel 206a passes through the material of interconnect 200 from surface 201a to surface 201b. FIG. 5D shows internal dimensions of channel 206a. Hydrogen port 208d interfaces with hydrogen output channel 209 from fuel processor 15. A portion of a gasket seals port 208d and channel 209. Hydrogen port 208a interfaces with hydrogen channel 74 for fuel cell 20 via a port 211a included in the bottom surface of top plate 64 (FIG. 5C).

Interconnect 200 also communicates unused hydrogen and anode exhaust from fuel cell 20 back to a burner fuel processor 15. A hydrogen conduit 204c in interconnect 200 then forms part of a hydrogen return line 38 (FIG. 1C). Hydrogen conduit 204c receives unused hydrogen from channel 86 included in top plate 64 (FIGS. 5B and 5C) and outputs the anode exhaust to a burner inlet 109 in the fuel processor. Line 38 thus includes (in order of delivery): anode exit via channel 86 in fuel cell 20, conduit 204c in interconnect 200, and inlet 109 in fuel processor 15. Conduit 204c includes a channel 206c and two ports 208c and 208b (FIG. 5A). Channel 206c passes through the material of interconnect 200 from surface 201b to surface 201a. FIG. 5D shows internal dimensions of channel 206c. Port 208b interfaces with an anode exhaust inlet channel 109 in fuel processor 15. A portion of a gasket seals port 208b and channel 109. Port 208c interfaces with anode exhaust channel 86 of fuel cell 20 via a port 211c included in the bottom surface of top plate 64 (FIG. 5C).

Interconnect 200 communicates heated oxygen and cathode exhaust from fuel cell 20 to a burner in fuel processor 15. The heated oxygen is used for catalytic combustion in the burner, and increases thermal efficiency of the package. An oxygen conduit 204b in interconnect 200 then forms part of oxygen line 33 (FIG. 1C). Oxygen conduit 204b receives heated oxygen and air from channel 90 included in top plate 64 (FIGS. 5B and 5C) and outputs the heated oxygen to a burner inlet in the fuel processor. Line 33 thus includes (in order of delivery): cathode exit via channel 90 in fuel cell 20, conduit 204b in interconnect 200, and an inlet to the burner in fuel processor 15. Conduit 204b includes a channel 206b and two ports 208e and 208f (FIG. 5A). Channel 206b passes through the material of interconnect 200 from surface 201b to surface 201a. FIG. 5D shows internal dimensions of channel 206b. Port 208f interfaces with a burner inlet in fuel processor 15. Port 208e interfaces with cathode exhaust channel 90 of fuel cell 20 via a port 211b included in the bottom surface of top plate 64 (FIG. 5C).

Interconnect 200 additionally communicates burner exhaust from fuel processor 15 to heat transfer appendages in fuel cell 20. The burner exhaust reacts with a catalyst disposed near the fuel cell to heat the fuel cell and expedite fuel cell start-up. A burner exhaust conduit 204d in interconnect 200 then forms part of exhaust line 35 (FIG. 1C). Conduit 204d receives burner exhaust from a burner outlet in the fuel processor and outputs burner exhaust to a heating region 262 in the fuel cell (FIG. 2B). Line 35 thus includes (in order of delivery): a burner exit in fuel processor 15, conduit 204d in interconnect 200, and heating region 262 in fuel cell 20. Conduit 204d includes a channel 206d and two ports 208g and 208e (FIG. 5A). Channel 206d passes through the material of interconnect 200 from surface 201a to surface that faces the body of the fuel cell. FIG. 5D shows internal dimensions of channel 206d. Port 208g interfaces with a burner outlet in fuel processor 15. A portion of a gasket seals port 208g and the burner outlet. Port 208e opens to region 262 in the fuel cell 20.

Interconnect 200 is also responsible for fuel source delivery to fuel processor 15. A reformer fuel source inlet 81 receives methanol from a fuel source feed (pump 21b and an upstream storage device 16, see FIG. 1C) and includes a conduit 206e internal to interconnect 200 that delivers the methanol to a boiler in the fuel processor that heats the methanol before delivery to the reformer. A burner fuel source inlet 20f receives methanol from a second fuel source feed (a second pump 21a and upstream storage device 16) and includes a conduit 206f internal to interconnect 200 that delivers the methanol to a boiler in the fuel processor that heats the methanol before delivery to the catalytic burner.

In general, interconnect 200 may include any suitable number of conduits for communicating fluids and gases between a fuel cell and fuel processor. From 1 to about 8 conduits is suitable for many micro fuel cell systems and packages. Each conduit may be dedicated to a particular gas or fluid. Dedicated conduits may be responsible for: oxygen, hydrogen, burner or reformer exhaust, methanol or another fuel source, air, or any other reactant or process gas or liquid used in a fuel processor or fuel cell. It is understood that some of these substances may go in either direction (or both) between a fuel cell and a fuel processor.

In general, a conduit 204 may communicate a gas or liquid between any portion or portions of a fuel cell or fuel processor. For example, a conduit may receive a gas from a dedicated manifold in a fuel cell or fuel processor. Alternatively, a conduit may deliver a gas to a region within a fuel cell, such as a volume that includes one or more heat transfer appendages. The conduits 204 may be variably configured according to design demands. In one embodiment, an interconnect and its conduits 204 are designed and configured to reduce volume of the integrated fuel cell package. In another embodiment, conduits 204 are designed and configured to align with existing fluid channels and conduits of a fuel cell and fuel processor.

A gasket may also be employed to interface between interconnect 200 and the fuel cell 20 or between interconnect 200 and fuel processor 15. For example, a gasket may be disposed during assembly between end plate 184 of fuel processor 15 and interconnect 200. A gasket 260 between interconnect 200 and fuel cell 20 is also discussed below.

One issue that arises with combining a fuel cell and fuel processor in a common and compact package is operating temperature differences between the two. Depending on the specific fuel cell, processor, and their respective catalysts, temperature differences between the two structures in a compact package may vary significantly. For example, one suitable fuel processor 15 operates above 250° C., while fuel cell 20 typically operates about 190° C. (or below). Putting the two objects in close proximity introduces potential heat transfer, and resulting thermal efficiency losses in the fuel processor if the heat transfer cannot be controlled.

Interconnect 200 is designed to reduce heat transfer between a fuel processor and a fuel cell. In one embodiment, the interconnect serves as an insulation for heat transfer between the fuel cell and the fuel processor and includes a low thermal conductance material. In another embodiment, the interconnect contains a minimal amount of material in contact with the fuel cell and/or fuel processor, which minimizes thermal conduction between the two components via the interconnect. This reduces material restrictions on interconnect 200.

Figure 5F:
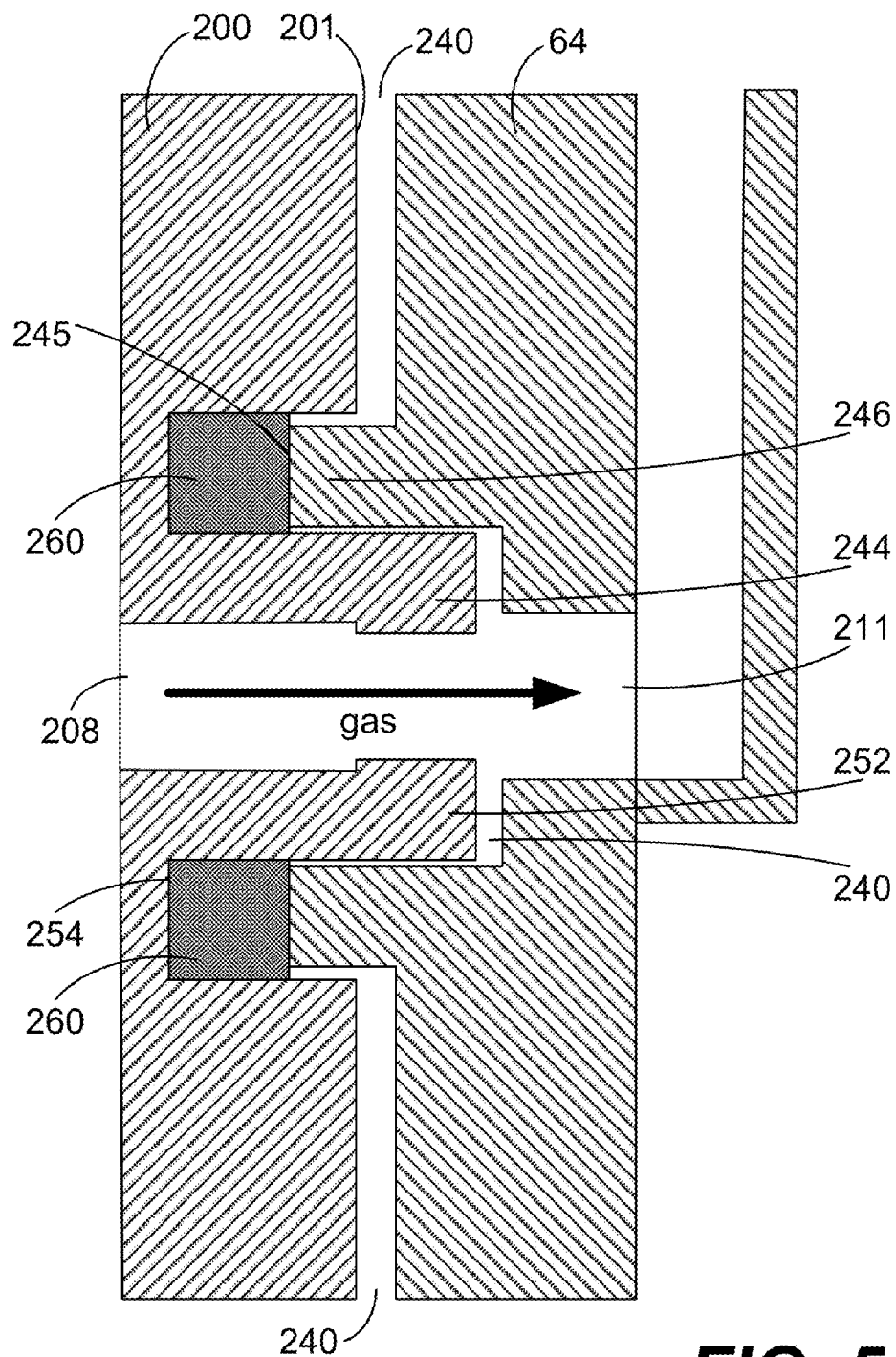
FIG. 5F illustrates an expanded view of the interface between the interconnect of FIG. 5A and the top plate of a fuel cell.
Figure 6:
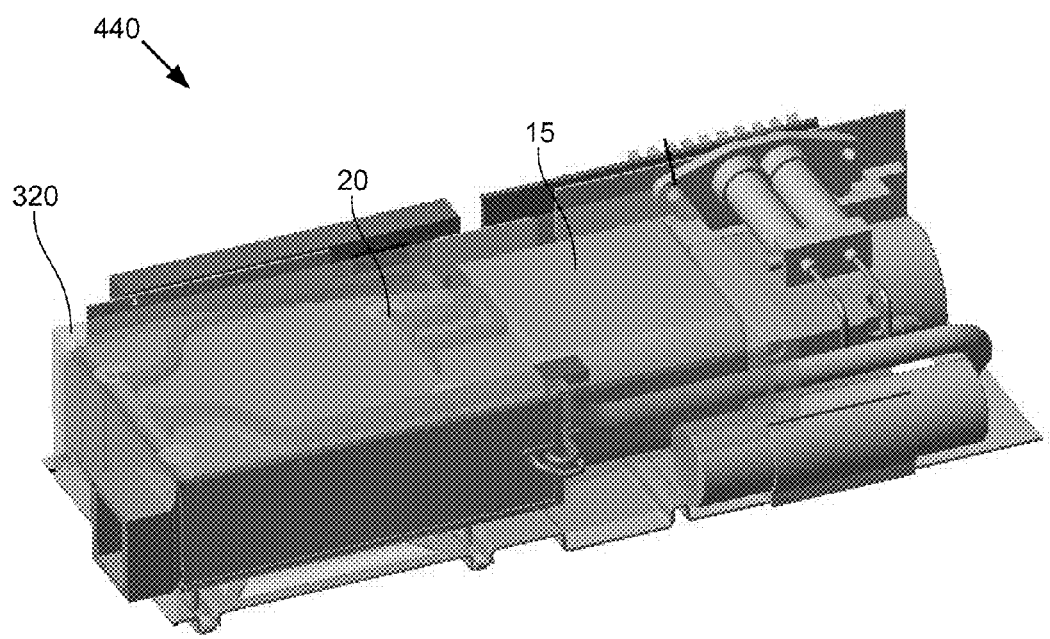
FIG. 6 shows a perspective view of insulation disposed about internal components of a fuel cell package in accordance with a specific embodiment of the present invention.

FIG. 5F illustrates an expanded side view of the contact between interconnect 200 and top plate 64 about a port 208 in accordance with one embodiment of the present invention. As shown, interconnect 200 maintains one or more gaps 240 between one of its sides 201 the bottom surface of plate 64. The gaps 240 may be left empty or filled with an insulation (FIG. 6). Air gaps 240 each act as a layer of low thermal capacity material and low thermal conductance insulation to minimize heat transfer between the interconnect and the fuel processor or fuel cell.

Mating features 244 and 246 reduce surface area contact between facing surfaces of each structure. This further reduces conductive heat transfer between the fuel cell and interconnect.

Mating features 244 include heightened portions 252 of each port 208 that extend above a recessed surface 254 on side 201b of interconnect 200. FIG. 5F shows the mating arrangement 246 on the bottom surface of top plate 64. Recessed surface 254 receives a distal end of 245 of mating features 246 on the top plate 64. Mating features 244 and 246 are shaped in surface area so as to overlap in depth when interconnect 200 and top plate 64 are coupled together.

Recessed surface 254 also receives a gasket 260 that facilitates sealing between interconnect 200 and top plate 64. Gasket 260 surrounds each port 208 on surface 254. Gasket 260 is suitably compressible, and prevents contact between interconnect 200 and top plate 64 when the package has been assembled. More specifically, gasket 260 is shaped to border the outside of heightened portions 252 of each port 208, and interrupts the distal end of 245 of mating features 246 on top plate 64 before they contact with recessed surface 254. Gasket 260 thus improves sealing between the two structures and their respective channels, and improves gaseous flow in the fuel cell system. In one embodiment, gasket 260 includes a custom cut graphoil gasket shaped to follow the contours of recessed surface 254, or another high temperature, low thermal conductance and compliant material. The low thermal conductance gasket 260 also reduces heat transfer between top plate 64 and interconnect 200.

Heightened portions 252 of each port 208 also provide improved gasketing. More specifically, heightened portions 252 prevent extrusion of gasket 260 (resting on recessed surface 254) into a channel 206 or screw hole 215 that otherwise might occur during assembly in the absence of heightened portions 252.

Mating features 244 and 246 also facilitate alignment between the two structures. Collectively, the shape and spatial arrangement of ports 208 and holes 211 (and their mating features 244 and 246) provides a unique structural interface between interconnect 200 and top plate 64 of fuel cell 20 when interconnect 200 attaches to top plate 64. FIG. 5A shows one exemplary 'crop circle' configuration that includes a series of circles. Top plate 64 has a matching configuration 258 on its bottom side. When interconnect 200 and top plate 64 are coupled or attached together, the shape and spatial arrangement of ports 208 and screw holes 211 deterministically align and locate top plate 64 relative to interconnect 200. Joining the two pieces also provides forces that resist relative motion (translations and rotations in three dimensions) between top plate 64 and interconnect 200. Other spatial arrangements and configurations are suitable and contemplated. For example, the number of circles, spacing or area arrangement may be altered.

Screw holes 215 permit mechanical coupling between interconnect 200 and top plate 64. Screw holes 215 also include heightened features that facilitate alignment, and add to the unique structural interface, between interconnect 200 and fuel cell 20.

Interconnect 200 has multiple advantages. Typically, a fuel cell system includes significant amount of plumbing between a fuel cell and fuel processor. Such plumbing consumes considerable space. One advantage of interconnect 200 is that it reduces size of a single package containing both a fuel processor and fuel cell by eliminating numerous tubes and additional plumbing associated with a disparate fuel cell and fuel processor. Interconnect 200 also avoids the need for brazing metal tubes, which affects manufacture. Although the present invention may include one or more brazed metal tubes, reducing the number of pipes with interconnect 200 decreases manufacturing complexity.

While interconnect 200 has been described with respect to a separate structure that separably attaches to both a fuel cell and a fuel processor, it is understood that the interconnect may be included as an integral part of a fuel cell, or as an integral part of a fuel processor, that the other attaches to.

Package Insulation

Many fuel cells and fuel processors operate at elevated temperatures. Burner 30 temperatures from about 200 degrees Celsius to about 800 degrees Celsius are common. Many fuel cells 20 operate at elevated temperatures during electrical energy production. The electrochemical reaction responsible for hydrogen consumption and electrical energy generation typically requires an elevated temperature. Start temperatures in the MEA layer 62 and its constituent parts greater than 150 degrees Celsius are common.

The ambient environment around the fuel cell package is cooler, and typically less than 40 degrees Celsius. Heat loss from the fuel cell or fuel processor to the ambient environment decreases efficiency of each device, and of the fuel cell package.

In one embodiment, a fuel cell package of the present invention includes insulation that reduces heat loss from a fuel cell or a fuel processor. The insulation is disposed at least partially around the fuel cell and/or fuel processor and beneath the package housing. The insulation reduces heat transfer from the fuel cell and/or fuel processor to the package housing, which reduces temperatures for the housing. This in turn reduces heat loss to the ambient environment. Thus, the insulation keeps heat in the package and increases efficiency for the components running at elevated temperatures.

FIG. 6 shows a perspective view of insulation 320 disposed about internal components and under the housing of the fuel cell package 440 of FIG. 4C in accordance with a specific embodiment of the present invention. FIG. 4B also shows insulation 320 disposed around the fuel cell 20 and fuel processor 15. In both cases, insulation 320 has been shown with some transparency to facilitate illustration and description. As shown, insulation 320 disposed at least partially around the outside of fuel cell 20 to minimize heat loss from the fuel cell. Insulation 320 is also disposed at least partially around fuel processor 15 to reduce heat loss from the fuel processor.

Insulation 320 may include one or more layers of a low thermal conductance material. The insulation layer may be wrapped around the fuel cell 20, fuel processor 15 and/or fuel cell system package. Thickness for the insulation layer and the number of wrappings around each component may be varied according to design. Increasing the thickness or the number of wrappings decreases heat loss. In one embodiment, the insulation is selected and configured such that the surface of fuel cell package 440 maintains a desired temperature. Standards imposed on consumer-electronics devices may mandate surface temperature of electronics devices such as a tethered fuel cell package to be less than some predetermined level, and insulation 320 may be designed to regularly meet this level. Some consumer-electronics device standards require a surface temperature less than 50° C. A thickness from about 1 millimeter to about 10 millimeters is suitable for some designs. In a specific embodiment, insulation 320 has a thickness of about 2 millimeters and is wrapped twice about the fuel cell and fuel processor. In a specific embodiment, one layer of material is disposed on the fuel cell between manifolds, while a second layer surrounds the entire fuel cell.

Insulation 320 may include a commercially available sheet of insulation. One suitable commercially available insulation material comprises aerogel insulation as provided by Aspen Systems, Inc. of Marlborough, Mass. Other forms of insulation may be used. One of skill in the art will appreciate the wide variety of commercially available insulation products useful herein to achieve a desired temperature drop.

In a specific embodiment, an insulation layer is disposed around a fuel cell and a processor in addition to a layer of insulation around the fuel cell system package. This dual insulation set further maintains heat in the heat generating components of the fuel cell system.

A fuel cell package may also include one or more air gaps in addition to insulation 320. The gaps may be disposed between the insulation and package, between the insulation and the fuel cell or between the insulation and the fuel processor. A fan may move air through the gaps to facilitate heat dissipation away from a housing or surface of the package.

CONCLUSION

While this invention has been described in terms of several preferred embodiments, there are alterations, permutations, and equivalents that fall within the scope of this invention which have been omitted for brevity's sake. For example, although the present invention has been described systems and methods operating on a fuel cell system and package, many of the methods and techniques described constitute system controls and will comprise digital control applied by a processor that implements instructions from stored software. While not described in detail, implementation of such digital control onto a mechanical system is well known to one of skill in the art and the present invention may thus relate to instructions stored in software capable of carrying out methods described herein. It is therefore intended that the scope of the invention should be determined with reference to the appended claims.

What is claimed is:

1. A fuel cell package for providing electrical energy, the fuel cell package comprising:
   a fuel processor that includes
      a reformer configured to receive a fuel source, configured to output hydrogen, and including a catalyst that facilitates the production of hydrogen from the fuel source,
      a heater configured to generate heat for transfer to the reformer;
   a fuel cell configured to generate electrical energy using hydrogen output by the fuel processor; and
   an interconnect disposed at least partially sandwiched between the fuel cell and the fuel processor and including a set of conduits that each communicate a liquid or gas between the fuel processor and the fuel cell, wherein the interconnect serves as passive insulation for conductive heat transfer between the fuel cell and the fuel processor;
   wherein the fuel cell contains a top plate having a port, at least one flat portion and at least one protrusion;
   wherein the interconnect contains a side having a port, at least one flat portion, and at least one recessed area;
   wherein the side of the interconnect is connected to the fuel cell by virtue of the port of the side of the interconnect aligning with the port of the top plate, and with the at least one protrusion of the top plate aligning with the at least one recessed area of the side of the interconnect, wherein the at least one protrusion of the top plate is connected to the at least one recessed area of the side interconnect by virtue of a gasket, wherein the at least one flat portion of the top plate is separated from the at least one flat portion of the side of the interconnect by a gap; and
   wherein the side of the interconnect further contains at least one heightened portion and the top plate of the fuel cell contains at least one recessed area, and wherein the at least one heightened portion of the side of the interconnect is separated from the at least one recessed area of the top plate of the fuel cell by a gap.

2. The fuel cell package of claim 1 wherein each conduit passes from one surface of the interconnect to another surface of the interconnect.

3. The fuel cell package of claim 1 wherein the interconnect includes a hydrogen conduit that receives hydrogen from a hydrogen channel in the fuel processor and outputs the hydrogen to a hydrogen channel in the fuel cell.

4. The fuel cell package of claim 1 wherein the interconnect includes an oxygen conduit that receives oxygen from an oxygen channel in the fuel cell and outputs the oxygen to an oxygen channel in the fuel processor.

5. The fuel cell package of claim 1 wherein the interconnect includes a heating conduit that receives a heating medium from the fuel processor and outputs the heating medium to the fuel cell.

6. The fuel cell package of claim 1 wherein the interconnect includes a hydrogen return channel that receives unused hydrogen from the fuel cell and outputs the unused hydrogen to the fuel processor.

7. The fuel cell package of claim 1 wherein the interconnect is a separate piece from the fuel processor and from the fuel cell before assembly of the fuel cell package and attaches to the fuel processor and attaches to the fuel cell after assembly.

8. The fuel cell package of claim 1 wherein the fuel cell includes a plate that couples to the interconnect, the plate including a set of channels that each open to a conduit included in the interconnect.

9. The fuel cell package of claim 8 wherein the interconnect includes mating features that contact the plate after the fuel cell package has been assembled.

10. The fuel cell package of claim 9 wherein the mating reduces surface area contact between the interconnect and the fuel cell relative to the amount of surface area contact between the interconnect and the fuel cell without the mating features.

11. The fuel cell package of claim 10 further comprising a gasket disposed between the interconnect and the plate.

12. The fuel cell package of claim 11 wherein the mating features on the interconnect include heightened features that prevent extrusion of the gasket into a conduit.

13. The fuel cell package of claim 12 further comprising an air gap between the interconnect and the plate, wherein the gap has no gasket.

14. The fuel cell package of claim 13 further comprising an insulation-filled gap between the interconnect and the plate, wherein the gap has no gasket.

15. The fuel cell package of claim 1 wherein the package occupies less than about 1 liter.

16. The fuel cell package of claim 1 wherein the package does not include any tubes that communicate a gas or liquid between the fuel processor and the fuel cell.

17. The fuel cell package of claim 1, wherein liquids or gasses traveling from the fuel processor to the fuel cell travel in a first direction from the fuel processor then in a second direction into a top plate of the fuel cell, wherein the first direction is perpendicular to the second direction.

18. The fuel cell package of claim 17, wherein liquids or gasses traveling from the fuel cell to the fuel processor travel in a third direction from the top plate of the fuel cell then in a fourth direction into the fuel processor, wherein the third direction is perpendicular to the fourth direction.

19. The fuel cell package of claim 1, wherein the interconnect includes a low thermal conductance material.

* * * * *